US010938819B2

(12) United States Patent
Da Silva Peixoto et al.

(10) Patent No.: US 10,938,819 B2
(45) Date of Patent: Mar. 2, 2021

(54) POISONING PROTECTION FOR PROCESS CONTROL SWITCHES

(71) Applicant: FISHER-ROSEMOUNT SYSTEMS, INC., Round Rock, TX (US)

(72) Inventors: Alexandre Da Silva Peixoto, Leander, TX (US); Neil J. Peterson, Austin, TX (US)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 231 days.

(21) Appl. No.: 15/949,888

(22) Filed: Apr. 10, 2018

(65) Prior Publication Data

US 2019/0104107 A1    Apr. 4, 2019

Related U.S. Application Data

(60) Provisional application No. 62/565,924, filed on Sep. 29, 2017, provisional application No. 62/565,920, filed on Sep. 29, 2017.

(51) Int. Cl.
*H04L 29/06*        (2006.01)
*H04L 12/759*       (2013.01)
(Continued)

(52) U.S. Cl.
CPC ........ *H04L 63/101* (2013.01); *G06F 16/2282* (2019.01); *H04L 12/413* (2013.01);
(Continued)

(58) Field of Classification Search
CPC ... H04L 63/101; H04L 12/413; H04L 45/028; H04L 63/02; H04L 63/0876; H04L 63/10;
(Continued)

(56) References Cited

U.S. PATENT DOCUMENTS 6,505,255 B1    1/2003 Akatsu et al.
7,512,146 B1    3/2009 Sivasankaran et al.
(Continued)

FOREIGN PATENT DOCUMENTS

GB    2 358 761 A    8/2001
GB    2 463 791 A    3/2010
(Continued)

OTHER PUBLICATIONS

Guruprasad et al., "Security Features in Ethernet Switches for Access Networks," IEEE Tencon (2003).
(Continued)

*Primary Examiner* — Ghodrat Jamshidi
(74) *Attorney, Agent, or Firm* — Marshall, Gerstein & Borun LLP

(57) ABSTRACT

A smart process control switch can implement a lockdown routine to lockdown its communication ports exclusively for use by devices having known physical addresses, enabling the smart process control switch to prevent new, potentially hostile, devices from communicating with other devices to which the smart process control switch is connected. Further, the smart process control switch can implement an address mapping routine to identify "known pairs" of physical and network addresses for each device communicating via a port of the smart process control switch. Thus, even if a new hostile device is able to spoof a known physical address in an attempt to bypass locked ports, the smart process control switch can detect the hostile device by checking the network address of the hostile device against the expected network address for the "known pair."

20 Claims, 14 Drawing Sheets

(51) Int. Cl.
*H04L 12/413* (2006.01)
*G06F 16/22* (2019.01)
H04L 12/801 (2013.01)
H04L 12/743 (2013.01)
H04L 12/40 (2006.01)
G05B 19/418 (2006.01)

(52) U.S. Cl.
CPC ............ *H04L 45/028* (2013.01); *H04L 63/02* (2013.01); *H04L 63/0876* (2013.01); *H04L 63/10* (2013.01); *H04L 63/1416* (2013.01); *H04L 63/1441* (2013.01); G05B 19/41855 (2013.01); G05B 2219/25022 (2013.01); G05B 2219/31151 (2013.01); H04L 45/7457 (2013.01); H04L 47/12 (2013.01); H04L 2012/4026 (2013.01)

(58) Field of Classification Search
CPC ............ H04L 63/1416; H04L 63/1441; H04L 45/7457; H04L 47/12; H04L 2012/4026; G06F 16/2282; G05B 19/41855; G05B 2219/25002; G05B 2219/31151
See application file for complete search history.

(56) References Cited

U.S. PATENT DOCUMENTS

| | | | |
|---|---|---|---|
| 7,516,487 B1* | 4/2009 | Szeto | H04L 63/0263 726/11 |
| 7,860,092 B2 | 12/2010 | Yoon et al. | |
| 8,590,033 B2 | 11/2013 | Schleiss et al. | |
| 8,812,466 B2 | 8/2014 | Wilson | |
| 9,130,980 B2 | 9/2015 | Law et al. | |
| 9,177,163 B1 | 11/2015 | Fredinburg et al. | |
| 9,344,296 B2 | 5/2016 | Gerlach et al. | |
| 9,467,459 B2* | 10/2016 | Chandrasekaran | H04W 12/1202 |
| 9,888,018 B1 | 2/2018 | Flowers | |
| 9,912,639 B1* | 3/2018 | Wighe | H04L 63/0263 |
| 10,505,893 B1* | 12/2019 | Griggs | H04L 61/2007 |
| 2003/0061345 A1* | 3/2003 | Kawasaki | H04L 41/06 709/224 |
| 2004/0162996 A1 | 8/2004 | Wallace et al. | |
| 2004/0230323 A1 | 11/2004 | Glanzer et al. | |
| 2006/0034181 A1 | 2/2006 | Noguchi et al. | |
| 2006/0053491 A1 | 3/2006 | Khuti et al. | |
| 2006/0161770 A1* | 7/2006 | Goto | H04L 29/12009 713/167 |
| 2006/0248229 A1* | 11/2006 | Saunderson | H04L 61/2015 709/245 |
| 2007/0043467 A1 | 2/2007 | Rustad et al. | |
| 2007/0127385 A1* | 6/2007 | Yasuie | H04L 41/0677 370/242 |
| 2008/0060067 A1* | 3/2008 | Kim | H04L 61/10 726/7 |
| 2008/0253380 A1* | 10/2008 | Cazares | H04L 12/4666 370/395.53 |
| 2009/0005981 A1 | 1/2009 | Forstall et al. | |
| 2009/0172156 A1* | 7/2009 | Yadav | H04L 29/12028 709/224 |
| 2010/0077471 A1* | 3/2010 | Schleiss | G05B 19/0428 726/13 |
| 2011/0158248 A1 | 6/2011 | Vorunganti et al. | |
| 2011/0320693 A1 | 12/2011 | Assarpour et al. | |
| 2013/0058341 A1 | 3/2013 | Fulton et al. | |
| 2013/0070745 A1 | 3/2013 | Nixon et al. | |
| 2013/0229924 A1* | 9/2013 | Salam | H04L 61/10 370/244 |
| 2015/0161404 A1 | 6/2015 | Mayes et al. | |
| 2015/0341307 A1* | 11/2015 | Page | H04L 69/22 370/392 |
| 2015/0365325 A1* | 12/2015 | Hwang | H04L 47/70 370/230 |
| 2016/0373441 A1* | 12/2016 | Sirivara | H04L 9/0861 |
| 2017/0026287 A1* | 1/2017 | Vinsel | H04L 45/02 |
| 2017/0032462 A1* | 2/2017 | Perrett | H04L 69/323 |
| 2017/0078115 A1* | 3/2017 | Zhou | H04L 12/4633 |
| 2017/0093912 A1 | 3/2017 | Poomalai et al. | |
| 2017/0286544 A1* | 10/2017 | Hunt | H04L 63/1416 |
| 2018/0103049 A1 | 4/2018 | Garry | |
| 2018/0113627 A1* | 4/2018 | Ting | G06F 3/0608 |
| 2018/0191681 A1* | 7/2018 | Mihelich | H04L 63/0263 |
| 2018/0198634 A1* | 7/2018 | Lentczner | H04L 69/22 |

FOREIGN PATENT DOCUMENTS

| | | |
|---|---|---|
| GB | 2 493 479 A | 2/2013 |
| TW | 200643706 A | 12/2006 |

OTHER PUBLICATIONS

Search Report for Application No. GB1814878.3, dated Mar. 4, 2019.
Search Report for Application No. GB1814879.1, dated Jan. 31, 2019.
"LAN Switching," Wikipedia. http://en.wikipedia.org/wiki/LAN_switching#Layer_2_switching. Retrieved Aug. 11, 2017.
"How do routers traverse packets to their destination?" Stack Exchange. Http://networkengineering.stackexchange.com/questions/33991/how-do-routers-traverse-packets-to-their-destination?rq=1. Retrieved Aug. 11, 2017.
"How does a switch know where to route packet, when there is another switch in front of the destination?" Stack Exchange. Http://networkengineering.stackexchange.com/questions/20893/how-does-a-switch-know-where-to-route-packet-when-there-is-another-switch-in-fr. Retrieved Aug. 11, 2017.
"Layer 3 switches explained" Tech Target. Http://searchnetworking.techtarget.com/tip/Layer-3-switches-explained. Retrieved Aug. 23, 2017.
U.S. Appl. No. 15/949,879, filed Apr. 10, 2018.

* cited by examiner

FIG. 4A

Network Device Command Center

Tools  Help

- Network Device Command Center
  - DeltaV Area Control Network
    - Decommissioned Switches
    - Primary Network (DELTAV
      - Commissioned Switches
      - Primary Network (DELTAV
        - SW01_$X
        - SW02_$X
    - Other Network (L2.5)
      - Decommissioned Switches
      - N Network
      - Commissioned Devices
      - N Network
  - Other Network (DELTAV SECON
    - Decommissioned Switches
    - N Network
    - Commissioned Devices
    - N Network
  - SW03_$X
  - SW03_X022_$W
  - SFW_X012_$W Discovering Network devices... — 402

Network Device Command Center (on PPLUS-SECURITY)

| Name | Location Description |
|---|---|
| DeltaV Area Control Network | |
| Other Network (L2.5) | |
| Other Network (DELTAV SECO... | |

406

408 (not shown as this screenshot was taken on a machine with simplex comms

NUM

FIG. 4C

| PORT | IP ADDRESS | MAC ADDRESS | LOCKDOWN STATUS | SECURITY STATUS |
|---|---|---|---|---|
| 1 | 10.10.10.2 | 00:0C:F5:09:56:E9 | LOCKED | NORMAL |
| 2 | 10.10.10.3 | 01:23:AE:76:B7:28 | LOCKED | ALERT |
| 3 | — | — | UNLOCKED | NORMAL |
| 4 | 10.10.20.2 | B2:7A:91:52:C7:E8 | LOCKED | NORMAL |
| 5 | 10.10.20.3 | 07:64:AI:FD:27:93 | LOCKED | NORMAL |
| 6 | — | — | UNLOCKED | ALERT |

FIG. 5

POISONING PROTECTION FOR PROCESS CONTROL SWITCHES

CROSS REFERENCE TO RELATED APPLICATIONS

This application claims priority to (i) U.S. Provisional Application No. 62/565,920, filed Sep. 29, 2017, titled "Enhanced Smart Process Control Switch Port Lockdown," and (ii) U.S. Provisional Application No. 62/565,924, filed Sep. 29, 2017, titled "Poisoning Protection for Process Control Switches;" each of which is hereby incorporated by reference for all purposes.

TECHNICAL FIELD

The present disclosure generally relates to process control systems and, more particularly, to techniques for locking down ports of a smart process control switch.

BACKGROUND

Process control systems, such as distributed or scalable process control systems like those used in power generation, chemical, petroleum, or other processes, typically include one or more process controllers communicatively coupled to each other, to at least one host or operator workstation via a process control network and to one or more field devices via analog, digital or combined analog/digital buses.

The field devices, which may be, for example, valves, valve positioners, switches and transmitters (e.g., temperature, pressure and flow rate sensors), perform functions within the process or plant such as opening or closing valves, switching devices on and off, and measuring process parameters.

The process controllers, which are typically located within the process plant environment, receive signals indicative of process measurements or process variables made by or associated with the field devices and/or other information pertaining to the field devices, and execute controller applications or routines. Each controller uses the received information to implement a control routine and generate control signals that are sent over the buses to the field devices to control the operation of the process or plant. The controller routine or routines implement control modules that make process control decisions, generate control signals based on the received information, and coordinate with the control modules or blocks in the field devices such as HART® and Fieldbus field devices. The control modules in the process controllers send the control signals over the communication lines or signal paths to the field devices, to thereby control the operation of the process.

Information from the field devices and the process controllers is typically made available to one or more other hardware devices such as, operator workstations, maintenance workstations, personal computers, handheld devices, data historians, report generators, centralized databases, etc., via the process control network. The information communicated over the network enables an operator or a maintenance person to perform desired functions with respect to the process. For example, the information allows an operator to change settings of the process control routine, modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc.

The field devices usually communicate with the hardware devices over the process control network, which may be an Ethernet-configured LAN. The network relays the process parameters, network information, and other process control data through various network devices and to various entities in the process control system. The network devices typically facilitate the flow of data through the network by controlling its routing, frame rate, timeout, and other network parameters, but do not change the process data itself. Some typical network devices include, e.g., Layer 2 network switches, Layer 3 network switches, routers, and/or hubs. The Layers herewith referenced are related to the OSI model layers.

Generally speaking, a Layer 2 network switch receives a message and forwards the received message via one of its ports associated with a MAC address of the destination device (identified by the message) within a LAN. A Layer 2 network switch typically stores a table establishing relationships between MAC addresses and corresponding switch ports. When the Layer 2 network switch receives a message, it identifies the destination MAC address of the message, identifies from the table a port of the switch corresponding to the MAC address, and forwards the message via that port. If the Layer 2 network switch receives a message with a destination MAC address that is not stored in the table, it will broadcast the message to all ports of the switch, which may repeat until the message reaches the destination device and the destination device replies, thus notifying the switch of the appropriate port "mapped" to the destination MAC address. Notably, Layer 2 switches do not perform routing, do not utilize IP addresses to make forwarding decisions, and do not track intermediary nodes between the switch and the destination device. Rather, a Layer 2 switch simply references the table to determine which port of the switch should be used to forward the message.

On the other hand, Layer 3 devices (such as routers and Layer 3 switches) often perform routing, identify intermediary nodes, and utilize IP addresses for forwarding and/or routing. This routing capability and ability to utilize network addresses enables Layer 3 devices to route data to destinations outside of a LAN to which the Layer 3 device is connected. While routers and Layer 3 network switches are sometimes capable of routing process control data within a process control network, routers and Layer 3 switches can be significantly more expensive than Layer 2 switches, particularly when designed or configured for operation in a process control environment (e.g., two to three times more expensive).

As process control networks grow in size and complexity, the number and type of network devices correspondingly increases. As a result of system and network growth, security and management in these complex systems becomes increasingly challenging. For example, each network device may include one or more communication ports that provide an access point or port for physically inter-connecting the process control system components and other network devices to each other across the network. These network device ports may become an access point for network expansion by adding other devices or may allow an entity, malicious or not, to access the network and initiate unwanted and potentially harmful network traffic.

To address security concerns regarding malicious entities, some control switches have a disabling mechanism for disabling a port (e.g., an unused port) to prevent a device from communicating via the disabled port. Further, some control switches sometimes have lockdown mechanisms (e.g., as disclosed in U.S. Pat. No. 8,590,033) that can "lock" a port to limit communication via the locked port to a single device that was connected to that port at the time of lock down. However, these traditional lockdown mechanism are limited. In particular, the traditional lockdown mechanisms fail to lockdown (i) ports having more than two connected devices and/or (ii) ports connected to a second switch (sometimes called an "uplink port"). Uplink ports are generally excluded from a network security lockdown (i.e., left unlocked) in order to maintain uplink port functionality during the lockdown and to avoid inadvertently implementing an overly restrictive lockdown that interferes with plant operation. Further, some switches categorize a port connected to a daisy chain of devices as an "uplink port" in response to identifying multiple devices connected to the port and assuming the port is connected to a switch. Thus, while some control switches may implement traditional lockdown mechanisms to prevent a hostile device from connecting to a network via a port that was previously unused (e.g., by disabling that port) or that was connected to only a single end-device (e.g., by locking that port), these switches remain vulnerable at any ports connected to an uplink switch, to more than two end-devices, or to a single device having multiple physical addresses (e.g., virtualized systems).

SUMMARY

The described methods and systems enable a process control switch to lockdown all of its ports and/or to identify "known pairs" of physical and network address for each device communicating via each port of the process control switch.

In an embodiment, a method improves security of a process control system within a process plant that includes process control switches connected to devices via communication ports of the process control switches comprise. The method may comprise: (A) initiating a lockdown of a set of communication ports of a process control switch; (B) in association with initiating the lockdown of the set of communication ports: obtaining, by the process control switch, a set of network addresses of a set of devices connected to at least a portion of the set of communication ports, and generating an address matching table for the process control switch, wherein the address matching table matches a set of physical addresses of the set of devices to the set of network addresses of the set of devices; and/or (C) after the lockdown of the set of communication ports: receiving, via one of the set of communication ports, a data packet from a device, the data packet indicating (i) a network address of the device and (ii) a physical address of the device, determining that the network address of the device and the physical address of the device are not included in the address matching table, and/or in response to the determining, generating an alert.

In an embodiment, a process control switch for use in a process control system within a process plant comprises: (A) a set of communication ports to which devices of the process control system are configured to connect; (B) content-addressable memory; and/or (C) a set of application-specific integrated circuits (ASICs) communicatively coupled to the set of communication ports and the content-addressable memory, and configured to (a) initiate a lockdown of at least a portion of the set of communication ports. The ASICs may additionally or alternatively be configured to: (b) in association with initiating the lockdown of at least the portion of the set of communication ports: (1) obtain a set of network addresses of a set of devices connected to at least a portion of the set of communication ports, and/or (2) generate an address matching table that matches a set of physical addresses of the set of devices to the set of network addresses of the set of devices. The ASICs may additionally or alternatively be configured to: (c) after the lockdown of the set of communication ports: (1) receive, via one of the set of communication ports, a data packet from a device, the data packet indicating (i) a network address of the device and (ii) a physical address of the device; (2) determine that the network address of the device and the physical address of the device are not included in the address matching table; and/or (3) in response to the determining, generate an alert.

In an embodiment, a method exists for detecting security issues associated with a process control switch associated with a process control system within a process plant, wherein the process control switch is connected to a set of devices via a set of communication ports of the process control switch. The method may comprise one or more of the following: (A) accessing an address matching table associated with the process control switch, wherein the matching table matches a set of physical addresses of a set of devices to a set of network addresses of the set of devices; (B) broadcasting a mapping request specifying a destination network address, the destination network address matching one of the set of network addresses included in the address matching table; (C) receiving, via one of the set of communication ports, a reply to the mapping request from a replying device, the reply indicating (i) the destination network address and (ii) a physical address of the replying device; (D) determining that the physical address of the replying device does not match the set of physical addresses of the set of devices included in the address matching table; and/or (E) in response to the determining, generating an alert.

In an embodiment, a system exists for detecting security issues associated with a process control system within a process plant. The system may comprise one or more of the following: (A) a user interface configured to present content; and (B) a process control switch connected, via a set of communication ports, to a set of devices associated with the process control system, and configured to: (1) access an address matching table associated with the process control switch, wherein the matching table matches a set of physical addresses of a set of devices to a set of network addresses of the set of devices, (2) broadcast a mapping request specifying a destination network address, the destination network address matching one of the set of network addresses included in the address matching table, (3) receive, via one of the set of communication ports, a reply to the mapping request from a replying device, the reply indicating (i) the destination network address and (ii) a physical address of the replying device, (4) determine that the physical address of the replying device does not match the set of physical addresses of the set of devices included in the address matching table, and/or (5) in response to the determining: generate an alert, and cause the alert to be presented on the user interface.

Note, this summary has been provided to introduce a selection of concepts further described below in the detailed description. As explained in the detailed description, certain embodiments may include features and advantages not described in this summary, and certain embodiments may omit one or more features and/or advantages described in this summary.

BRIEF DESCRIPTION OF THE DRAWINGS

Each of the figures described below depicts one or more aspects of the disclosed system(s) and/or method(s), according to an embodiment. The detailed description refers to reference numerals included in the following figures.

FIG. 4A illustrates an example user interface that can be provided to facilitate locking and unlocking the smart process control switches shown in FIGS. 1A-2C.

FIG. 4C illustrates the example user interface shown in FIGS. 4A and 4B, populated with a set of locked switches.

FIG. 5 illustrates an example of the address matching table shown in FIG. 2C.

DETAILED DESCRIPTION

Figure 1A:
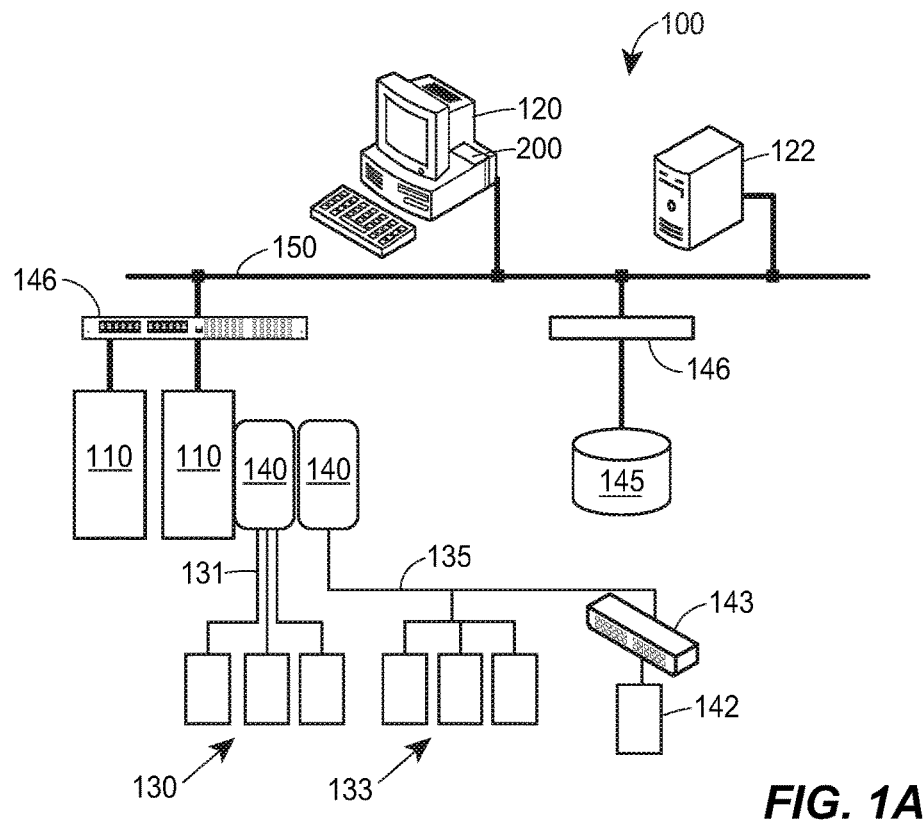
FIG. 1A is a schematic representation of a process control system within a process plant in which a smart process control switch may be implemented to enhance network security and facilitate network management and maintenance.

The present disclosure describes a smart process control switch 146 (shown in FIGS. 1A, 1B, and 2C, and sometimes referred to as the "switch 146") capable of (i) implementing a lockdown operation or routine to lockdown its communication ports exclusively for use by devices having known physical addresses, and/or (ii) implementing an address mapping operation or routine to identify "known pairs" of physical and network addresses for each device communicating via the switch 146.

Generally speaking, switches can be divided into two categories: configurable switches and non-configurable switches. Configurable switches (sometimes called "managed switches") are capable of having various network settings (e.g., port speed, virtual LANs, redundancy, port mirroring, and Quality of Service (QoS) for traffic prioritization, etc.) configured by a user so that the switch can be tailored to a particular implementation. Non-configurable switches (sometimes called "unmanaged switches") are generally configured by a manufacturer to OEM specifications with network settings that cannot be easily modified by an end-user. While configurable switches are often found in environments (e.g., industrial environments) where input and control over traffic is desired, non-configurable switches are typically aimed at environments requiring less sophisticated use (e.g., homes or small offices).

Generally speaking, as used herein, the phrase "managed switch" is not synonymous with the phrase "configurable switch" as described above, and the phrase "unmanaged switch" is not synonymous with the phrase "non-configurable switch" described above. Rather, the terms "managed" and "unmanaged" refer to the lockability of a switch. That is, as used herein, a "managed switch" refers to a switch possessing the lockdown functionality described herein, and an "unmanaged switch" refers to a switch lacking the lockdown functionality described herein. Because the switch 146 is configured to implement the described lockdown operation, the switched 146 may be referred to as a "managed switch."

The lockdown operation enables the switch 146 to lock its ports so that devices connected to its ports at the time of lockdown become "known" devices that are authorized to continue using that port while any "new" device is not allowed to communicate via the port. That is, the switch 146 "drops" communications received from "new" devices that connect to the switch 146 after the switch 146 has been locked, thus enabling the switch 146 to secure its ports from attack by a newly connected hostile device. Generally speaking, the term "connect," when used with reference to a device and a port of the switch 146, refers to a physical connection between the port and a physical medium (e.g., an Ethernet cable such as a CAT5 or CAT6 cable) that enables communication between the switch 146 and the device. The physical medium may connect to the device directly or indirectly via one or more intermediary devices that facilitate communication with the device.

When implementing the lockdown operation, the switch 146 may generate a record (e.g., a static address table) of physical addresses (e.g., MAC addresses) for all known devices connected (either directly or indirectly) to each port of the switch 146. Unlike traditional control switches, the switch 146 may generate a record of more than two physical devices connected to a single port. For example, when three, four, five, or more devices are daisy chained to a single port, the switch 146 may generate a record of the physical address for each of the plurality of devices daisy chained to the single port. Consequently, the switch 146 can "lock" every port and enable communication via the switch 146 for only those devices having known physical addresses (e.g., source physical addresses matching the physical addresses on record at the time the lockdown was initiated). In such a scenario, when a hostile device physically connects to a port of the switch 146 after lockdown, the switch 146 will not forward messages from the hostile device (assuming its physical address does not match a physical address of a device connected to that port at the time of lockdown). Consequently, the switch 146 can prevent a hostile device from joining the control network, thus preventing the hostile device from collecting sensitive information from the control network or taking unauthorized control of devices connected to the control network.

The lockdown operation may be implemented by the switch 146 in response to the switch 146 receiving a lock command that was transmitted in response to a device detecting a security threat on a network to which the switch 146 is connected. For example, the lock command may transmitted by a device (e.g., a computer such as a server, workstation, or controller) in the control system (e.g., the Delta V control system) implemented at the plant associated with the switch 146. As another example, the lock command may be transmitted by a security system (e.g., computers executing security software or specifically designed hardware such as an ASIC) that monitors network activity. The security system may include one or more systems for monitoring network activity, such as: access control systems, anti-keylogger systems, anti-malware systems, anti-spyware systems, anti-subversion systems, antivirus systems, cryptographic systems, firewall systems, intrusion detection systems (IDS), intrusion prevention systems (IPS), security information management systems, or security information and event management (SIEM) systems. One or more of these security system may work in coordination to generate a lock command. For example, a firewall system may detect a security threat and notify the SIEM (which may be configured to aggregate security threats from multiple sources), and the SIEM may respond by transmitting the lock command. Example security threats may be detected in any of a number of manners. For example, the security system may utilize signature-based detection (e.g., recognizing a known network signature of a known threat, such as malware) and/or anomaly-based detection (e.g., detecting deviations, such as a new logical port being opened on a node where only certain logical ports are expected to be opened and utilized, such as those associated with a particular protocol associated with the node).

The lockdown routine may be utilized in conjunction with a traffic control routine that limits the traffic at each port to a predetermined threshold. Each threshold for each port may be determined based on the type of device(s) connected to the port. For example, if a controller is connected to a port, the traffic utilization of the controller would not be expected to exceed certain amounts of ingress/egress traffic per port (e.g. 512 kbps ingress, or 1500 packets per second egress traffic, etc.), and the traffic threshold for that port may be set accordingly. Field devices may consume more or less traffic, so ports connected to field devices may have different traffic thresholds. In some instances, traffic control is an important feature for process control switches. For example, process control switches without traffic control may allow any amount of traffic exchanged among any type of devices and therefore not preventing basic denial-of-service attacks that could be easily detected if the specific communication requirements of a given process control system are observed—process control systems tend to be very predictable, therefore it is not difficult to set thresholds based on the protocol and device types used on these specific use cases.

With further reference to the lockdown operation, the switch 146 can determine when a port is connected to second switch (e.g., using bridge protocol bridge unit (BPDU) frames), and can perform a handshake with the second switch to determine whether the second switch is a second switch 146 or an "unmanaged switch" (e.g., a switch not having the disclosed lockdown capabilities). If the second switch is an unlockable or "unmanaged" switch, the switch 146 can identify and record the physical address of every end-device connected to the port of the switch 146 via the unlockable or "unmanaged" switch.

If desired, the switch 146 may leave unlocked certain ports during lockdown. For example the switch 146 may determine when a port is connected to a second switch (such a port may be called an "uplink port"), and may perform a handshake with the second switch to determine whether the second switch is "managed" (i.e., "lockable" like the switch 146) or "unmanaged" (i.e., not "lockable" like the switch 146). If the second switch is "managed," the switch 146 may leave unlocked the uplink port (and consequently may not inspect the source physical address of messages received via the uplink port, and/or may inspect the source physical address of messages but not drop messages having an unknown source physical address). Such an uplink port may be referred to as a "managed uplink port." If the second switch is "unmanaged," the switch 146 can identify and record the physical address of every end-device connected to the uplink port via the "unmanaged switch," and the uplink port may be referred to as an "unmanaged uplink port." The switch 146 may subsequently lock the uplink port so that the switch 146 drops messages originating from an unknown device connected to the unmanaged switch, preventing the unknown device (e.g., potentially a hostile device) from accessing the broader network to which the switch 146 is connected. It should be noted that locked ports of the switch 146 may continue to transmit broadcast and multicast messages from known devices, and that in such instances, an unknown or unauthorized device (i.e., a device not having a known physical address for a given port) may listen to these transmitted broadcast and multicast messages. However, in such instances, the unauthorized device will be unable to respond to those messages or to otherwise transmit any messages by way of the locked port of the switch 146.

The address mapping operation enables the switch 146 to verify, after lockdown, that a device with a known physical address is a known device by confirming that the device has not simply spoofed the known physical address. The switch 146 performs this verification by tracking a network address (e.g., IP address) for every known physical address. Thus, every known device for a given port should have a known address pair (i.e., a physical and network address) tracked by the switch 146. Consequently, even when a hostile device connects to a locked port of the switch 146 and successfully spoofs a physical address of a known device for that locked port, the switch 146 will detect that the network address of the hostile device does not match the network address on record that is paired to the physical address. Consequently, the switch 146 generates an alert and/or drops communications received from the hostile device.

The switch 146 may implement port mirroring if desired. For example, the switch 146 may copy packets entering or exiting a particular port, and may send the copied packets to an analyzer (e.g., via an assigned port associated with the analyzer). The analyzer may be any machine configured (e.g., via software) to analyze the copied packets. Port mirroring enables diagnostics and/or debugging to be performed on the copied packets without significantly affecting the devices sending and/or receiving the original packets.

Figure 1B:
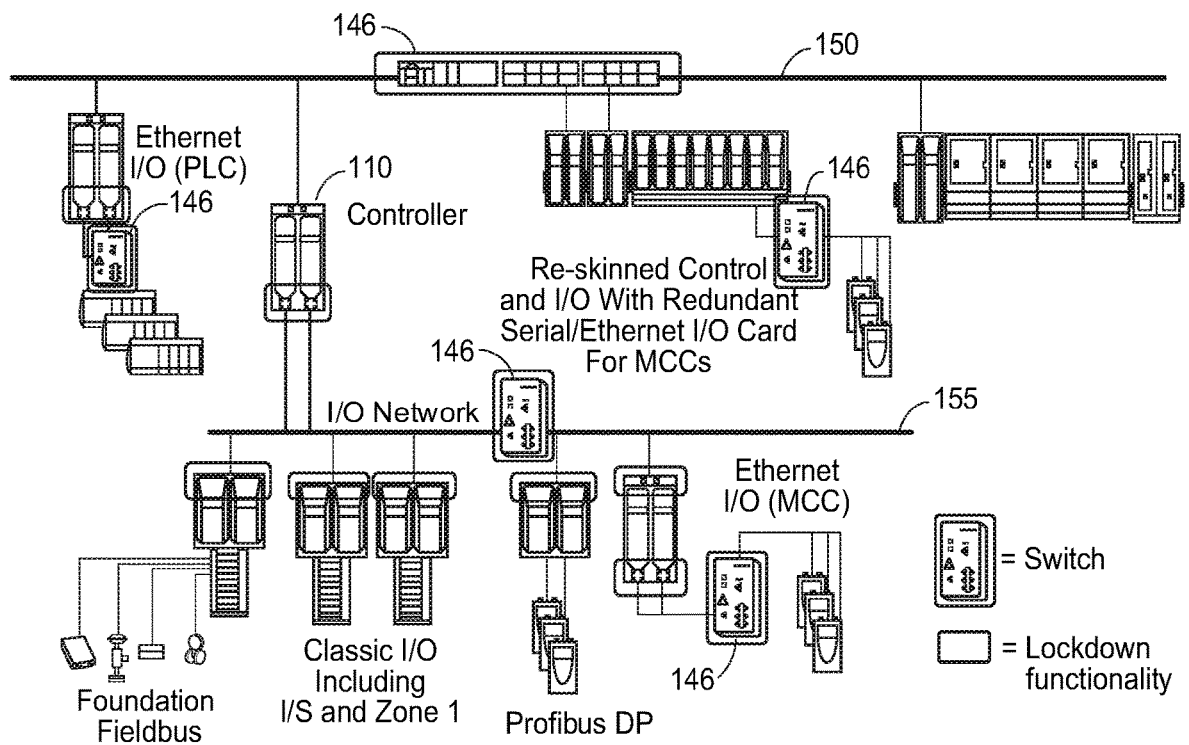
FIG. 1B is a second schematic representation of a process control system within a process plant in which the smart process control switch shown in FIG. 1A may be implemented to enhance network security and facilitate network management and maintenance.

FIGS. 1A and 1B are schematic representations of a process control system 100 within a process plant in which the switch 146 may be implemented to enhance network security and facilitate network management and maintenance. The process control system 100 includes a process control network 150, which is a collection of nodes (e.g., devices or systems capable of sending, receiving and/or forwarding information) and communication links connected to enable telecommunication between the nodes. The nodes of the network 150 include one or more switches 146; one or more process controllers 110; one or more host workstations or computers 120-122 (e.g., which may be approved workstations and/or servers) at least one of which includes a display screen; one or more input/output (I/O) cards 140; one or more field devices 130, 133, and/or 142; a gateway 143; and/or a data historian 145. Some embodiments do not include the field device 142 and gateway 143.

The network 150 is a local area network (LAN). In some instances, a wide area network (WAN) and/or telecommunications network may be part of the plant networks, but in some circumstances may not be an integral part of network 150. The network 150 may be configured for Ethernet communications and/or for any appropriate communications protocol (e.g., TCP/IP, proprietary protocols, etc.), and may be implemented using hardwired (preferred) or wireless technology. Additional aspects of the network 150 are described in more detail at the end of the Detailed Description.

The one or more process controllers 110 (each of which may be, by way of example, the DeltaV™ controller sold by Fisher Rosemount Systems, Inc.) are communicatively connected via one or more switches 146 and to the network 150 and to the one or more host workstations or computers 120-122. Each controller 110 may include one or more network interface cards (sometimes called "communication interfaces") and may be connected to the field devices 130 via the I/O cards 140, each of which may be communicatively connected to one of the controllers 110 via a backplane. The field devices 130 may be communicatively coupled to the network 150 (e.g., using DeltaV Electronic Marshalling technology). The network 150 can also be used to connect Ethernet-based I/O nodes such as DeltaV CHARM I/O Cards (CIOC), Wireless I/O Cards (WIOC), Ethernet I/O Cards (EIOC), etc. which connect to field devices using open protocols and transmit data back to one or more process controllers 110. Communication between controllers 110 and I/O nodes in this case may be expressly proprietary An I/O network 155, which may be a subnetwork of the network 150, facilitates communication between the controllers 110 (e.g., via the I/O cards 140) and field devices 130, 133, and 142. The I/O network 155 may include intermediary nodes not shown in FIG. 1A, such as additional switches 146 (see FIG. 1B). The I/O network 155 may be configured for Ethernet communications and/or for any appropriate communications protocol (e.g., TCP/IP, ModbusIP, etc.), and may be implemented using hardwired or wireless technology depending on the implementation. Some embodiments do not include the I/O network 155, or include a modified version of the I/O network 155 (e.g., some embodiments do not include switches between the controller 110 and the field devices).

The I/O cards 140 are communicatively connected to the field devices 130 using any desired hardware and software associated with, for example, standard 4-20 mA devices, standard Ethernet protocols, and/or any smart communication protocol such as the FOUNDATION Fieldbus protocol (Fieldbus), the HART protocol, or any other desired communication or controller protocol.

The field devices 130 may be any type of devices, such as sensors, valves, transmitters, positioners, etc. In the embodiment illustrated in FIG. 1A, the field devices 130 are HART devices that communicate over standard analog 4-20 mA lines 131 with a HART modem 140 while the field devices 133 are smart devices, such as Fieldbus field devices, that communicate over a digital bus 135 or I/O network 155 with an I/O card 140 using Fieldbus protocol communications. Of course, the field devices 130 and 133 could conform to any other desired standard(s) or protocols, including any standards or protocols developed in the future.

The field device 142 may be connected to the digital bus 135 via a specialized network device such as the gateway 143. For example, the field device 142 may only understand Profibus-PA commands and the I/O network 135 may implement the PROFIBUS-DP protocol. To this end, the gateway 143 may provide bidirectional PROFIBUS-DP/PA translation. A switch 146 may also be positioned at or near the gateway 143.

The controller 110, which may be one of many distributed controllers within the plant having one or more processors therein, implements or oversees one or more process control routines. The routines may include one or more control loops that are stored in or associated with the controller. The controller 110 also communicates with the devices 130 or 133, the host computers 120-122, and the data historian 145 through the network 150 and associated network devices 146 to control a process in any desired manner. It should be noted that any control routines or elements described herein may have parts thereof implemented or executed by different controllers or other devices if so desired. Likewise, the control routines or elements described herein to be implemented within the process control system 100 may take any form, including software, firmware, hardware, etc. For the purpose of this discussion, a process control element can be any part or portion of a process control system including, for example, a routine, a block or a module stored on any computer readable medium. Control routines, which may be modules or any part of a control procedure such as a subroutine, parts of a subroutine (such as lines of code), etc. may be implemented in any desired software format, such as using ladder logic, sequential function charts, function block diagrams, object oriented programming or any other software programming language or design paradigm. Likewise, the control routines may be hard coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 110 may be configured to implement a control strategy or control routine in any desired manner.

The data historian 145 may be any desired type of data collection unit having any desired type of memory and any desired or known software, hardware, or firmware for storing data and may be separate from or a part of one of the workstations 120-122. The data historian 145 may be communicatively coupled to the network 150 and/or hosts 120 and 122 via the switch 146.

Figure 1C:
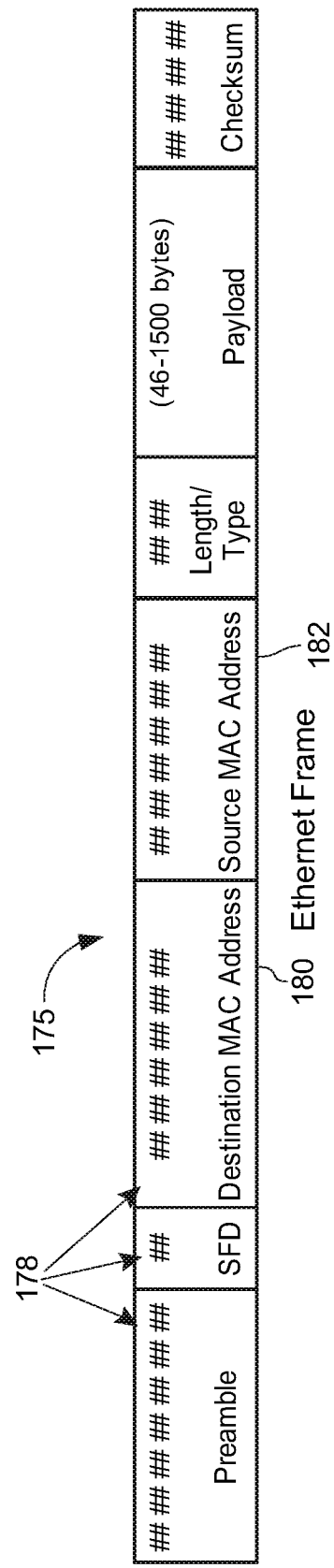
FIG. 1C illustrates a basic unit of data or a frame that may be communicated through the process control system generally using the Ethernet protocol.

FIG. 1C illustrates a basic unit of data or a frame 175 that may be communicated through the process control system 100 generally and through the process control network 150 using the Ethernet protocol. An Ethernet frame 175 includes seven fields that each carry information between devices, such as a switch 146 or other process control system 100 component. The fields may include a number of bytes of data 178 that are interpreted and processed by the receiving device. For example, the destination MAC address field 180 may include a physical address of the intermediate or destination node of the process control network 100, while the source MAC address field 182 may include a physical address of a sending or intermediate node of the process control system 100. The destination MAC address 180 and the source MAC address 182 fields may be used in conjunction with data from the switch 146 to process the data sent over the process control network 150. In some embodiments, the fields 180, 182 may be compared to one or more tables stored within a receiving network device when the device is in a "lockdown" status. The results of the comparison may be used to refuse or otherwise deny the received data or other physical or logical connections to the locked network device.

Figure 2A:
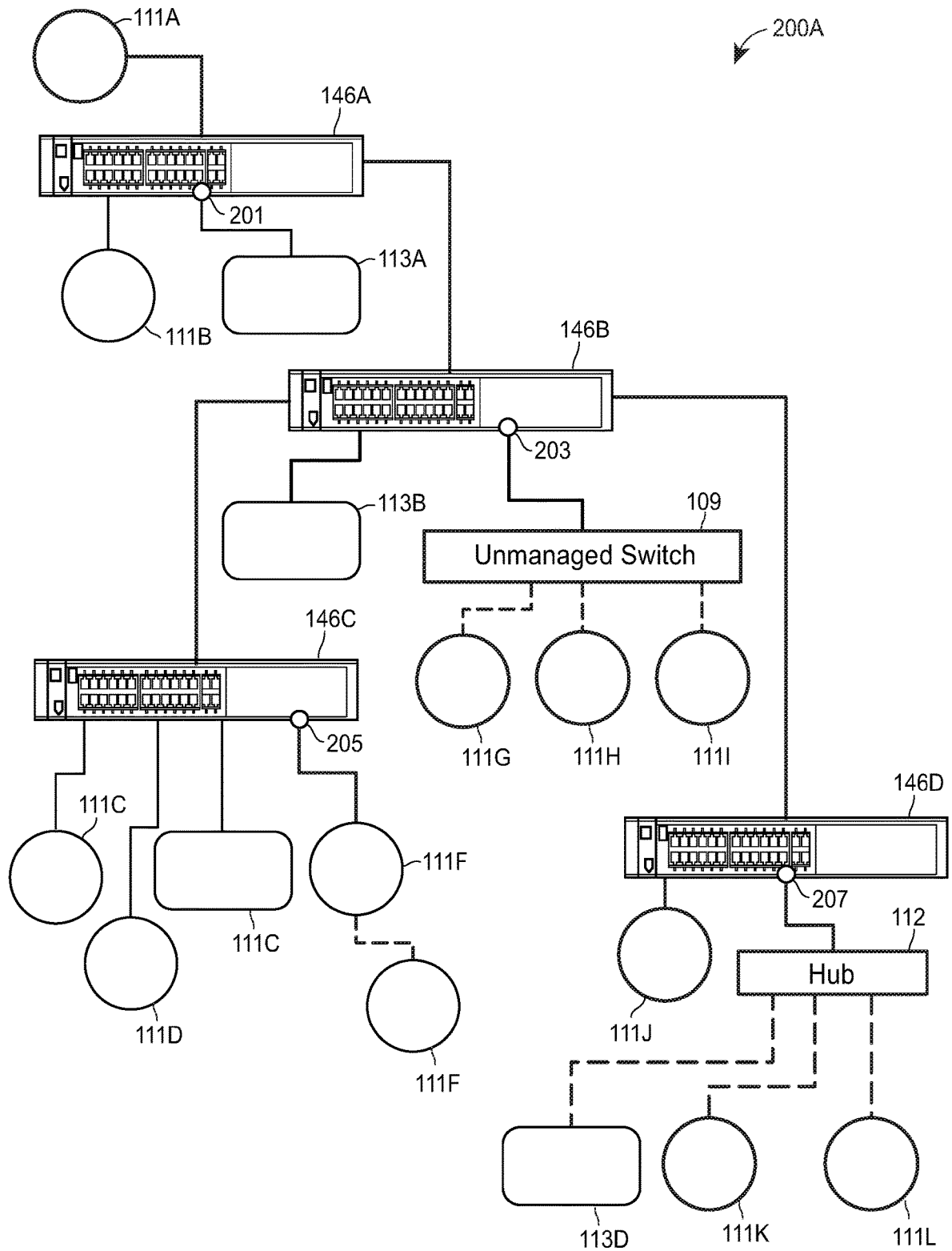
FIG. 2A is a network diagram of an example process control network in which a set of smart process control switches, each of which is similar to those shown in FIGS. 1A and 1B, is implemented to improve lockdown performance and enhance network security.
Figure 2B:
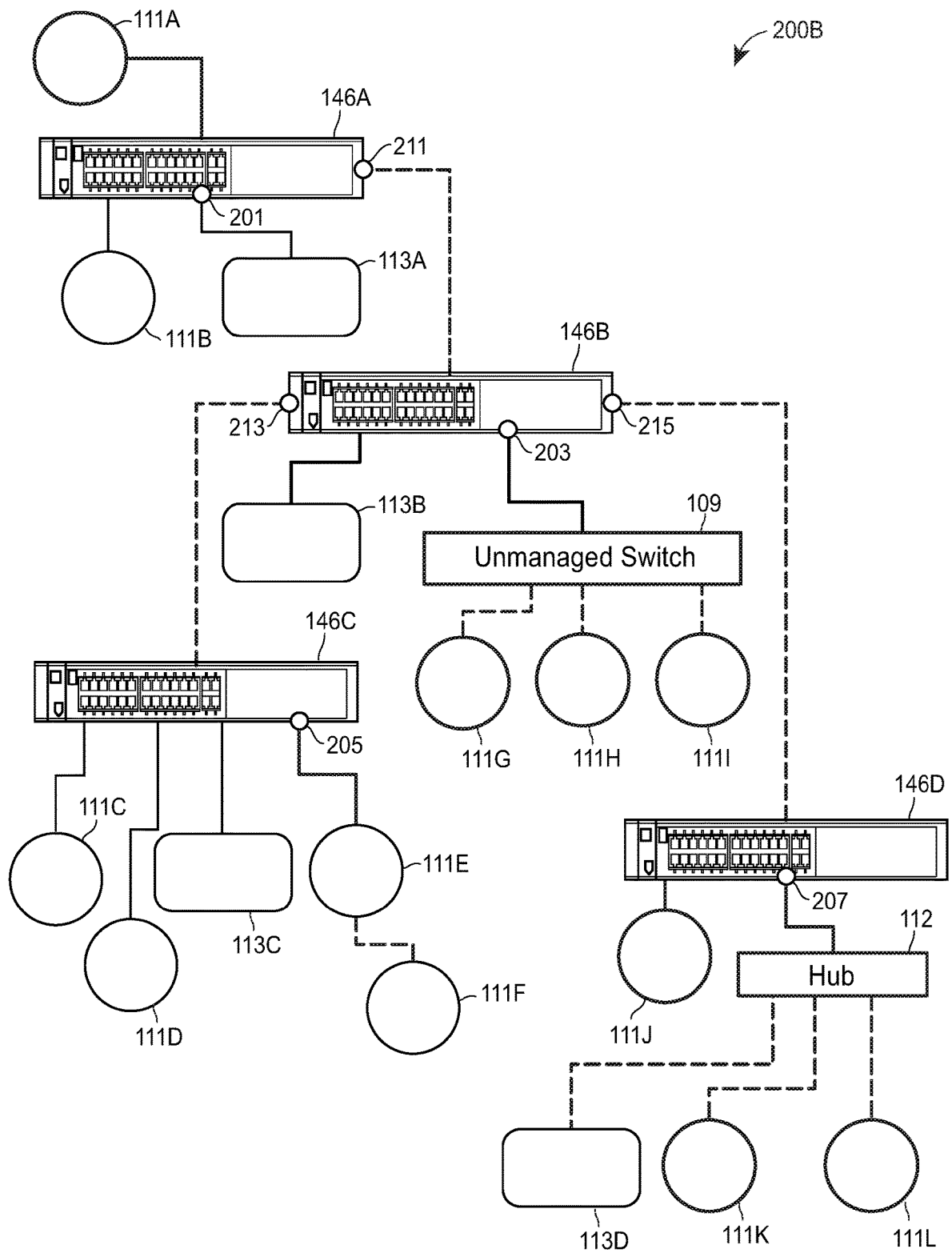
FIG. 2B is a network diagram of a second example process control network in which a set of smart process control switches is implemented to improve lockdown performance and enhance network security.
Figure 2C:
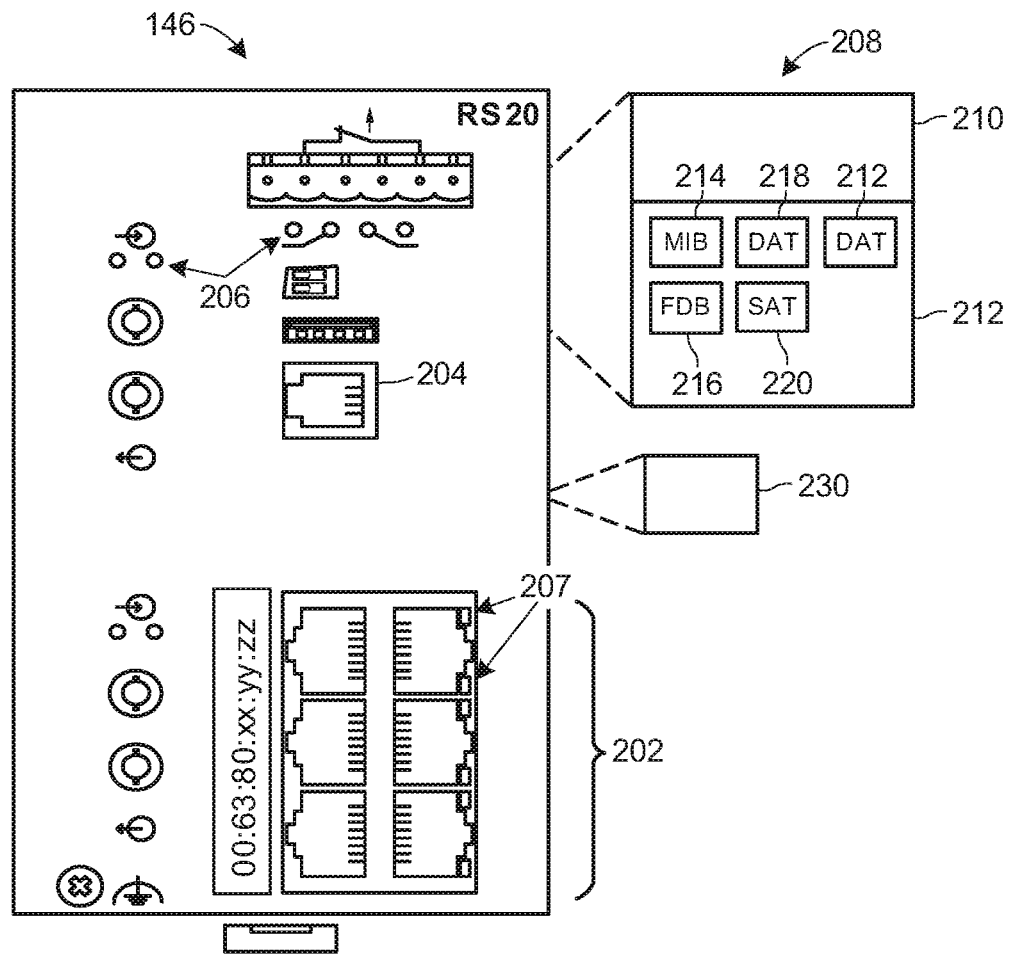
FIG. 2C is a block diagram of the smart process control switch shown in FIGS. 1A, 1B, and 2A.

FIG. 2A is a network diagram of an example process control network 200A in which a set of switches 146A-D, each of which represents an example of the switch 146 shown in FIG. 2C, are implemented to improve lockdown performance and enhance network security. The solid lines represent communication links connected to a locked port and the dotted lines represent communication links connected to an unlocked port. Advantageously, every port of the switches 146A-D can be locked down. Consequently, even if a hostile device connects to a process control device, a hub, or an unmanaged switch that is connected to a port of one of the switches 146A-D, the hostile device cannot communicate via that port when the respective switch 146A-D is locked down.

In addition to the switches 146A-D, the network 200A includes devices 111A-111L (collectively referred to as "devices 111"), devices 113A-113D (collectively referred to as "devices 113"), and a hub 112. The devices 111 are process control devices specifically configured to operate in a process control plant and to communicate via a process control network. Each of the devices 111 has one or two physical address (e.g., for redundancy). Generally, the physical address(es) for the devices 111 are MAC address(es) specifically configured so that the devices 111 will be recognized by other process control devices on the process control network 100D. For example, the physical address of each device 111 may begin or end with a particular recognized pattern of characters (e.g., F9-C3-XX-XX-XX-XX) so that each is recognizable as a device specifically configured for implementation in a process control environment. Example devices 111 include process controllers, I/O cards, workstations, data historians, and specially configured network devices.

The devices 113 include (i) devices not specifically configured for a process control network (sometimes called "off-the-shelf devices" or "general purpose devices") and/or (ii) devices having more than two physical addresses (which may include both specially configured process control devices and "general purpose" devices). The hub 112 is a general purpose network hub.

The switches 146A-D can lock all ports regardless of the type or number of devices connected to the ports and thus can prevent an attack by a hostile device that connects (directly or indirectly) to any port of any of the switches 146A-D. FIG. 2A depicts a number of examples in which the switches 146A-D improve on current process control switches. Below, four particular examples demonstrating advantages of the switches 146A-D are described: (i) locking a port connected to a "general purpose device" or a device (process control or "general purpose") with more than two physical addresses; (ii) locking a port connected to an unmanaged switch; (iii) locking a port connected to a set of daisy chained devices; and (iv) locking a port connected to an unmanaged network device, such as a hub, connected to multiple devices.

The first example involves the switch 146A, which includes a port 201 that can be locked when connected to the device 113A, which may be (i) a "general purpose device" with any number of physical addresses or (ii) a process control device with more than two physical addresses. In operation, the switch 146A implements a lockdown routine to lock the port 201. After lockdown, the switch 146A does not allow any device with a physical address different from that of device 113A to communicate via port 201. Said another way, the switch 146A will analyze any message received at the port 201 to identify a source physical address included in the message. If the message does not include a source physical address that matches the physical address of the device 113A known by the switch 146A at the time of lockdown, the switch 146A "drops" the message rather than forwarding the message via one of its other ports and a port violation alert is generated by the switch 146A. By comparison, a typical process control switch might fail to lock the port connected to device 113A because the device 113A is either a "general purpose" device or a device having more than two physical addresses, and typically process control switches do not lock such ports, even when a lockdown procedure is initiated.

The switch 146A also includes a port 211 connected to the switch 146B. As indicated by the solid line connected to port 211, port 211 is locked. Accordingly, the switch 146A may store physical addresses of all devices that communicate via the port 211 at the time of locking, including any physical addresses of devices connected to any of the switches 146B-D. In some instances, each of the switches 146B-D may receive a notification that it is connected to a switch 146 upstream (e.g., switch 146A), and may consequently not authenticate physical addresses during lockdown, under the assumption that the upstream switch 146 will authenticate physical addresses listed in messages to ensure that the listed physical address is a known address. In other instances, one or more of the switches 146B-D authenticate physical addresses during lockdown along with switch 146A.

The second example involves the switch 146B, which includes a port 203 that can be locked when connected to an unmanaged switch (i.e., a switch lacking the described lockdown capabilities or unable to transmit BPDU frames). The port 203, and any other port connected to a second switch (e.g., the port 211 of switch 146A and the ports 213, 215, and 217), may be referred to as an "uplink port." Note, in some circumstances the switches 146 may be configured to only identity managed uplink ports when identifying uplink ports, and thus the switch port 203 may not be categorized by the switch 146B as an uplink port (e.g., the switches 146 may be configured to only categorize as uplink ports those ports that are connected to other switches 146). The devices 111G-I are connected to the unmanaged switch 109, which is physically connected to the port 203. Notably, because the unmanaged switch 109 cannot lockdown its ports (as indicated by the dotted lines connecting the switch 109 to the devices 111G-1), a hostile device can connect to the switch 109 to communicate with other devices connected to the switch 109 (e.g., the devices 111G-111I). In other words, even if someone attempts to lockdown all of the lockable switches in the network 200A (e.g., the switches 146A-146D), a new device with an unknown physical can connect to the switch 109, and the switch 109 will forward messages from the hostile device to the port of the switch 109 that has been mapped to the destination address included in the message from the hostile device.

However, because the port 203 is locked by the switch 146B (as indicated by the solid line connecting the switches 146B and 109), any message from a new unknown device received at the port 203 will be dropped by the switch 146B. The message will be dropped because when the switch 146B is locked, it creates a record of known physical addresses of all known devices communicating via the port 203, even if those known devices are communicating via an unmanaged uplink switch such as the switch 109 (the switch 146B may create this record by monitoring and recording source and destination addresses of messages transmitted and received via the port 203). Thus, in the shown example, the switch 146B "locks" the record of known physical addresses so that only the physical addresses of devices 111G-I are associated with port 203. Consequently, any device that connects (e.g., via wired or wireless connection) to the switch 109 cannot communicate with other devices on the network 200A via the port 203 of switch 1466 (if the new device has a physical address matching that of one of the devices 111G-I, the switch 146 may utilize the address mapping table 222 to detect that the new device is not one of the devices 111G-I). In short, even though the port 203 is connected to an unmanaged switch (i.e., the switch 109) that does not lock its ports, the switch 146B can lock the port 203 so that only the devices connected to the switch 109 at the time of lockdown can communicate via the switch 146B.

Moving to the third example, FIG. 2A depicts the switch 146C including a port 205 that can be locked when a set of daisy chained devices 111E and 111F are connected to the port 205. The device 111E is physically connected to the port 205, and the device 111F is daisy chained to the device 111E, enabling the device 111F to communicate with other devices on the network 200A via its connection to the device 111E and the port 205. Generally speaking, the daisy chain connection is a pass-through connection, giving all daisy chained devices (i.e. 111E and 111F) direct access to port 205. Notably, the device 111E does not lock its access point connected to the device 111F, as shown by the dotted line between the devices 111E and 111F. Thus, a hostile device might connect to device 111E or 111F, either of which might forward messages received from the hostile device. However, if a new device is connected to the same daisy chain connected to port 205, or a device from the daisy chain is replaced with a new device, the switch 146C flags a port violation for port 205 and may not allow communications from any device connected to the daisy chain. In some instances, the switch 146C may simply drop messages from the new device during lockdown. The message is dropped because, when locking down the port 205, the switch 146C creates a record of known physical addresses for all known devices communicating via port 205 (e.g., devices 111E and 111F) and drops messages identifying a source physical address (e.g., a physical address of the hostile device) different from the known physical addresses. Accordingly, while a hostile device might connect to device 111E or 111F, any message from the hostile device will be dropped by the switch 146C (i.e., not forwarded via other ports of the switch 146C).

Finally, as a fourth example, FIG. 2A depicts the switch 146D including a port 207 that can be locked when connected to the unlockable hub 112, which is connected to multiple devices. In short, the switch 146D treats the hub 112 similarly to how the switch 146B treats the unmanaged switch 109. The devices 113D, 111K, and 111L are connected to the hub 112, which is physically connected to the port 207. Because the hub 112 cannot lockdown its ports (as indicated by the dotted lines connecting the hub 112 to the devices 113D, 111K, and 111L), a hostile device can connect to the hub 112 to communicate with other devices connected to the hub 112. However, because the port 207 is locked by the switch 146D, any message from a new unknown device received at the port 207 will be dropped by the switch 146D.

Notably, the devices 113D, 111K, and 111L can communicate by way of the network 200 because their physical addresses are registered in the memory of switch 146D and/or 146B. In some cases, for ease of use and convenience, uplink ports of the switches 146A-D (e.g., the ports 213 and 215) are not locked, but all physical addresses mapped to the uplink ports are registered (e.g., at the switch 146B and/or 146D) and a change to the address table is flagged and alerts are generated by the switch(es). If someone attempts to disconnect the switch 146D from the switch 146B and to connect a new hub to the port 215, for example, the switch 146B detects any unknown address of a device attempting to communicate by way of the new hub and the switch 146B. If someone attempts to insert the new hub as an intermediary device between the switch 146B and the switch 146D, both the switches 146B and 146D may detect the new hub (and/or any new address for a new device connected to the hub) and one or both may generate an alert regarding the new physical address that is now connected to the switches 146B and 146D. The uplink port detection mechanism allows users to identify when such physical access intervention is implemented.

FIG. 2B is a network diagram of an example process control network 200B in which the set of switches 146A-D are implemented. The network 200B is similar to the network 200A. Each of the switches 146A-D in network 200B is configured to detect when one of its ports is connected to a second switch (i.e., an uplink port) and to lock the uplink port only when the second switch is unmanaged. Each switch 146A-D may analyze a handshake with a second switch to determine whether or not the second switch is managed (e.g., to determine whether or not the second switch is a switch 146). During lockdown, each switch 146A-D may treat messages received via the uplink port differently depending on whether the connected second switch is lockable. Said another way, each switch 146A-D may lock or leave unlocked an uplink port depending on whether the second switch is lockable.

For example, switch 146A includes an uplink port 211 connected to the switch 146B. Because the switch 146B is lockable, the switch 146A leaves the uplink port 211 unlocked. Similarly, switch 146B leaves unlocked the uplink ports 213 and 215 because they are connected to the lockable switches 146C and 146D. The switch 146A may forward messages received from the switch 146B without authenticating source physical addresses included in the messages. One might say that the switch 146A "assumes" that the switch 146B is handling lockdown for its ports, and may therefore not lock the uplink port 211, even during lockdown. The switch 146B may similarly leave ports 213 and 215 unlocked. In some instances, the switches 146A and 146B continue to monitor source physical addresses of messages received via the uplink ports 211-215, and may compare the source physical addresses to known physical addressees. The switches 146A and 146B may generate a port violation alarm when the monitoring reveals that a source physical address is unknown.

When the second switch is not lockable (e.g., a generic or "off-the-shelf" switch), the switches 146A-D may lock an uplink port in the same manner as described with reference to FIG. 2A. For example, the switch 146B may lock the uplink port 203 (which is connected to an unmanaged or unlockable switch 109) as described with reference to FIG. 2A. In some instances, when an uplink port is locked, the switches 146A-D drop messages having unknown source physical addresses. In other instances, when an uplink port is locked, the switches 146A-D continue forwarding messages having unknown physical addresses while generating a port violation alarm or alert.

FIG. 2C is a block diagram of the switch 146, which may be a DeltaV Smart Switch for use in a DeltaV™ Process Control Network (of which there are different families available to address different use cases). The switch 146 is a Layer 2 switch, meaning that the switch 146 works at Layer 2 of the OSI model—the data-link layer. In operation, the switch 146 selects a forwarding port for a message by (i) identifying a destination physical address included in the message and (ii) referencing a switching table to identify the forwarding port associated with the destination physical address. The switch 146 does not track intermediary nodes. For example, if the switch 146 receives a message intended for an end-device connected to the switch 146 via four intermediary nodes, the switch 146 has no record of the "next node" or any of the other intermediary nodes. Rather, it references the switching table to determine which port should be used to forward the message. Further, the switch 146 does not track network addresses for message forwarding purposes, and it does not utilize IP routing tables.

By contrast, a Layer 3 network device, such as a router, operates at Layer 3 of the OSI model—the network layer—and typically utilizes a routing table. When the router receives a message, it identifies a destination network address included in the message. The router then references the routing table to identify an optimal route to reach the destination network address, identifies a "next hop" network address listed for the optimal route, and forwards the message to a device with the "next hop" network address. Layer 3 switches typically possess similar network routing intelligence as routers. In some instances, the switch 146 may be a Layer 3 switch. That is, in certain embodiments the switch 146 may utilize network addresses for routing and/or forwarding.

As previously noted, the switch 146 is a "smart process control switch," meaning the switch 146 is specifically configured for the process control environment and for communicating with devices unique to process control systems, such as process controllers, field devices, I/O cards, process control workstations, process control historians, etc. The switch 146 firmware may contain specific configurations that address DeltaV communication requirements such as storm control (limiting data transfer for specific communications) and/or loop prevention. The switch 146 may be configured for process control operation by downloading to the switch 146 firmware specifically designed for the process control system 100. The specialized firmware addresses use cases unique to the process control system 100 and generally is not accessible for users to change. Generally speaking, the utilized firmware is designed to prevent network loops, prevent network storms, and to lock down unused switch ports.

The switch 146 includes one or more communication ports 202, a console access port 204, and status lights 206. The communication ports 202 are used to interconnect various other network devices and process control system components for communication over the network 150, while the status lights 206 indicate current operations of the network device and may be used for diagnostic purposes. Generally speaking, the ports 202 are configured for receiving a wired, physical connection, such as an Ethernet connection (e.g., utilizing a CAT5 ScTP cable or a CAT6 cable) or a fiber optic connection.

The switch 146 also includes a circuit 230, which is an Application Specific Integrated Circuit (ASIC) specifically configured to perform the operations and functions performed by the switch 146. At a high level, the circuit 230 controls the ports 202. In particular, the circuit 230 enables and disables the ports 220, locks and unlocks the ports 220, and handles message received at the ports 220. While FIG. 2B depicts the circuit 230 as a single circuit, in some implementations the switch 146 may include a plurality of circuits that perform the functions described with reference to circuit 230.

Further, the switch 146 may include a memory 208 (which may include volatile memory 210 and/or nonvolatile memory 212) storing the following: (i) one or more standard and private management information bases (MIBs) 214; (ii) a switching table 216 (sometimes called a "forwarding database table" or "FDB table"); (iii) a dynamic address table 218; (iii) a static address table 220; and (iv) an address matching table 222. In some instances, the memory 208 may include content-addressable memory (CAM), and one or more of the tables 214-222 may be stored to the CAM.

Generally speaking, each of the MIBs 214 is a database of objects or variables that can be manipulated to manage a device (e.g., the switch 146) corresponding to the particular MIB 214. The MIBs 214 may include a collection of objects accessible through a command line interface (CLI) for managing the switch 146 and implementing functions specific to the process control network 150. One or more of the private MIBs 214 may include objects that can be managed by the circuit 230 to control the lockdown and unlocking functions described herein. Further, the circuit 230 may utilize the private MIBs 214 to provide an interface for DeltaV™ network security features through a runtime API that communicates with the switch 146. The process control network 150 may be configured to include a mixture of network devices that each includes a private MIB for controlling lockdown and unlocking functions (i.e., "locking devices"), and commercial, off-the-shelf network devices that have no lockdown or unlocking functions.

The switching table 216 includes one or more physical addresses (e.g., MAC addresses) and a corresponding port of the switch 146 for each physical address. In operation, the switch 146 receives a message at one of the ports 202. The circuit 230 analyzes the message to identify a destination physical address included in the message and references the switching table 216 to identify the port 202 corresponding to destination physical address. When the switching table 216 does not include the destination physical address, the circuit 230 may perform a flooding routine during which it causes the switch 146 to transmit the message via all of the ports 202. Assuming a device with the destination physical address is connected (either directly or indirectly) to one of the ports 202, the device will respond to the received message. After the switch 146 receives the response, the circuit 230 will record to the switching table 216 the destination physical address and the port 202 at which the circuit 230 received the response from the destination device.

Generally speaking, the switch 146 does not use the dynamic address table 218 for making decisions regarding forwarding or dropping of messages. Rather, the dynamic address table 218 represents a record of devices connected to ports that may be continuously updated over time. The dynamic address table 218 lists physical addresses for end devices currently connected to each port 202 of the switch 146. For example, the switch 146 may dynamically learn a mapping of a physical address to a particular port 202 by analyzing a frame 175 (shown in FIG. 1C) received from a device to identify the source MAC address 180 of the device. The switch 146 adds the source MAC address 180 to the dynamic address table 218 as a physical address mapped to the particular port 202. Further, the switch 146 may dynamically learn a mapping of a physical address to a second port by (i) analyzing the frame 175 to identify the destination MAC address 182 of the destination device, (ii) performing the flooding routine described with respect to the switching table 216, and (iii) identifying the port 202 at which a responsive message from the destination device is received. In some instances, the dynamic address table 218 can be periodically updated by copying information from the forwarding table 216. Further, in some implementations the switch 146 only uses one of the tables 216 and 218 for both forwarding decisions and tracking physical addresses of connected devices.

The circuit 230 may update the dynamic address table 218 as nodes are connected to or disconnected from the switch 146 by mapping new physical addresses to the port 202 to which the new device is connected and aging physical addresses that are not currently in use (e.g., tracking a time or number of messages that have passed without a message being successfully sent to or from a particular physical address). At the expiration of an aging time, for example, the circuit 230 may remove the physical address from the dynamic address table 218.

Similar to the dynamic address table 218, the static address table 220 lists physical addresses for end devices associated with each port 202. However, the physical address in the table 220 are not dynamically learned and do not age. Rather, they are explicitly entered by copying the dynamic table 218 when the switch 146 is locked. Functions implemented in the firmware of the switch 146 may compare the switching table 216 with the tables 218 and 220 to process incoming messages. The static address table 220 may be utilized by circuit 230 when implementing an authentication operation to authenticate source physical addresses included in messages received at the ports 202. In particular, if a source physical address for a received message is not identified as a known physical address that is mapped to the receiving port in the static address table 220, the circuit 230 may drop the message.

Generally speaking, physical addresses may be added to the switching table 216 while the switch 146 is in a normal or "unlocked" state. For example, in an "unlocked" state, when the switch 146 receives an Ethernet frame 175, the circuit 130 inspects the destination MAC address 180 and references the switching table 216 to identify the appropriate port 202 to which the frame 175 should be forwarded. If the switching table 216 does not include information on the received destination MAC address 180, the switch 146 broadcasts the Ethernet frame 175 to all ports in the network 150. Upon recognition of the broadcasted MAC at another network device, another frame may be sent to the broadcasting switch 146 that will add the discovered MAC address to the dynamic address table 218 and the FDB table 216. However, in a "lockdown" state (as further discussed below), the switching table 216 may be frozen in its current configuration to prevent further changes or additions. Previously-learned physical addresses and other information included in the dynamic address table 218 at the time of locking may be moved to the static address table 220, and learning for the switch 146 may be disabled. In a lockdown state, the switching table 216 cannot be changed, thus preventing the switch 146 from accepting and forwarding a frame 175 received from an unknown or not previously learned MAC address 182.

The address matching table 222 lists a network address for every known physical address stored at one or more of the tables 216, 218, and 220. The switch 146 may determine the network addresses for known physical addresses by sending ARP requests for the network addresses. Alternatively, in some instances a database may store a list of network addresses for nodes on the process control network 150, and the switch 146 may download from the database network addresses for known physical addresses. While the switch 146 does not utilize the address matching table 222 to select a forwarding port for a received message, the switch 146 can use the table 222 to prevent Address Resolution Protocol (ARP) spoofing. In particular, when the switch 146 is locked down, it can verify an identify of a source device that has transmitted a message to the switch 146 by verifying that the source device has a network address matching a known network address in the address matching table 222. This verification may be helpful when a hostile device has spoofed a physical address of a known device. The address matching table 222 is described in more detail below with reference to FIG. 5.

When the switch 146 has an uplink port (i.e., a port connected to a second switch), the switch 146 may implement a handshake with the second switch to determine whether the second switch is a "managed" switch or an "unmanaged" switch. Generally speaking, a "managed" switch is capable of locking its ports and an "unmanaged" switch is not capable of locking its ports. During the handshake, the switch 146 may receive an indication from the second switch regarding its "lockability" or status as a managed or unmanaged status. In some instances, the switch 146 may transmit a query to the second switch, and the second switch may respond with an indication that the second switch is managed. The second switch may also respond with an indication that the second switch is unmanaged, or may simply not respond. The failure to receive a response within a certain time period (e.g., 1 second, 5 seconds, 30 seconds, etc.) may serve as an indication to the switch 146 that the second switch is unmanaged.

When the switch 146 receives an indication that the second switch is managed, the switch 146 may bypass locking the second switch under the assumption that the second switch will handle locking the ports of the second switch. With that said, the switch 146 may monitor the source physical address of devices communicating by way of the second switch, and may compare these monitored source physical addresses against a record of known physical addresses. When the switch 146 detects a monitored source physical address connected to the second switch that is not a known physical address, the switch 146 may generate an alarm (e.g., a port violation alarm that may be transmitted to one of the workstations 120 or 122 for display via a user interface).

Figure 3A:
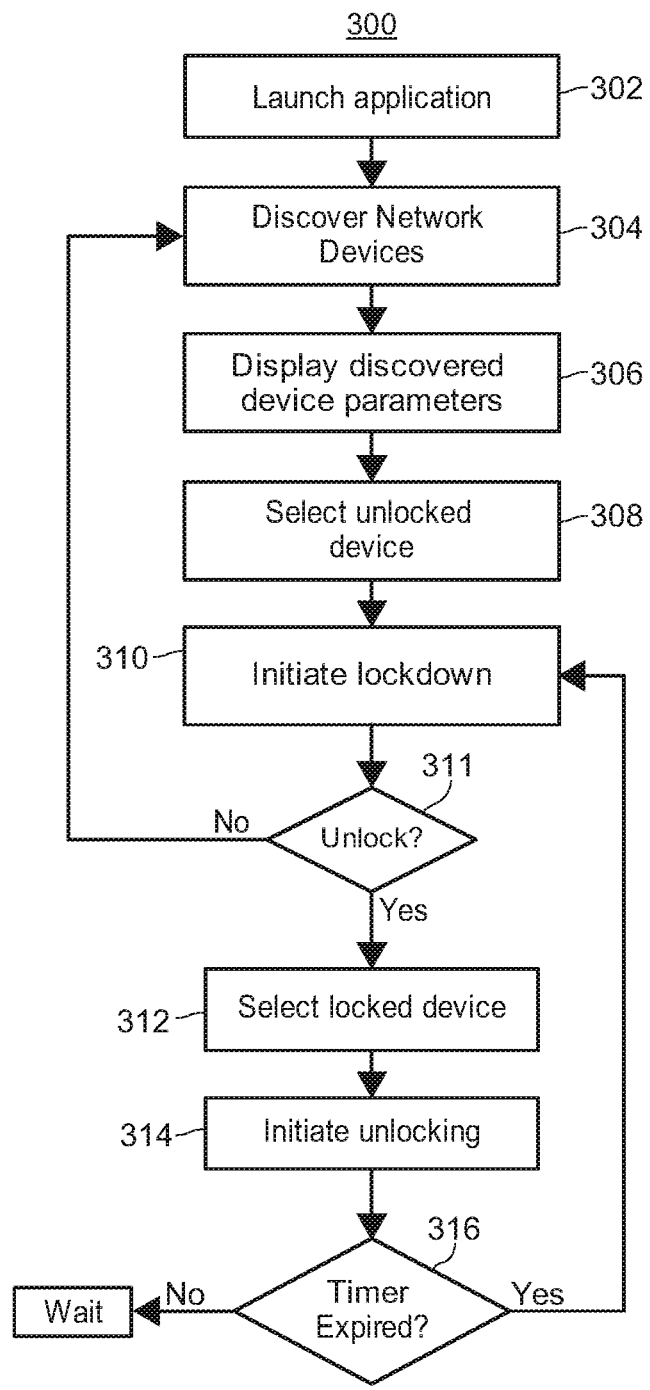
FIG. 3A illustrates an example method for locking down and unlocking ports for one or more of the smart process control switches shown in FIGS. 1A-2C.

FIG. 3A illustrates an example method 300 for locking down and unlocking ports 202 for one or more switches 146. In general, the method 300 allows a user of the process control system 100 to lockdown a switch 146 so that the switch 146 drops any messages received from "unknown" devices. For example, if a user unplugs a device from a port 202 of the switch 146 and plugs in a different device in its place, the switch 146 refuses any messages from the different device and alerts a user interface, monitoring service, and/or other application executing on a workstation 120, 122 of the system 100. In the lockdown state, all ports 202 in the networks 150 and/or 155 may be locked, preventing any new device with an "unknown" physical addresses from communicating via the ports 202. While the methods below generally reference the user interface 400 shown in FIGS. 4A-D, it will be understood that any suitable user interface for performing the described functions may be utilized.

At block 302, a user may launch a process control network security application that displays the user interface 400 (shown in FIGS. 4A-D) to begin the lockdown process. One of the workstations 120 or 122 may provide the user interface 400, which may utilize MIBs 214 at the switch 146 to initiate lock down and unlocking procedures.

At block 304, the application may initiate switch discovery, which may be automatic (e.g., upon launch) or in response to input from a user. The user interface 400 may display a status indication 402 of "Discovering Switches" or another indication that one or more switches 146 of the process control network 150 are being identified. In some embodiments, the application may disable one or more function buttons of the user interface 400 upon initiating network device discovery. A user may also manually initiate network device discovery. In some instances, the application may discover any switch (managed or unmanaged) present within the process control network 150. In other instances, the application may identify only those network devices, such as the switch 146, that include lock down functionality.

The application may discover a switch 146 by searching the network 150 using one or more parameters. In some instances, the application may additionally or alternatively search the network 155. The switch 146 may be initially discovered using a physical address of the switch 146. The switch 146 may be configured during a commissioning process to have a network address. After this commissioning process, communication with the switch 146 by way of the MIB 214 is enabled (e.g., the switch 146 may be identified by locating the private MIB 214 of the switch 146), and devices outside the LAN may transmit messages to the switch 146 by addressing the messages to the network address of the switch 146. The application may search for switches 146 by searching a specified range of physical addresses and/or network addresses. Note, while the switch 146 may itself have a network address, the switch 146 generally does not rely on network addresses of other devices when selecting a forwarding port for received messages.

Figure 4B:
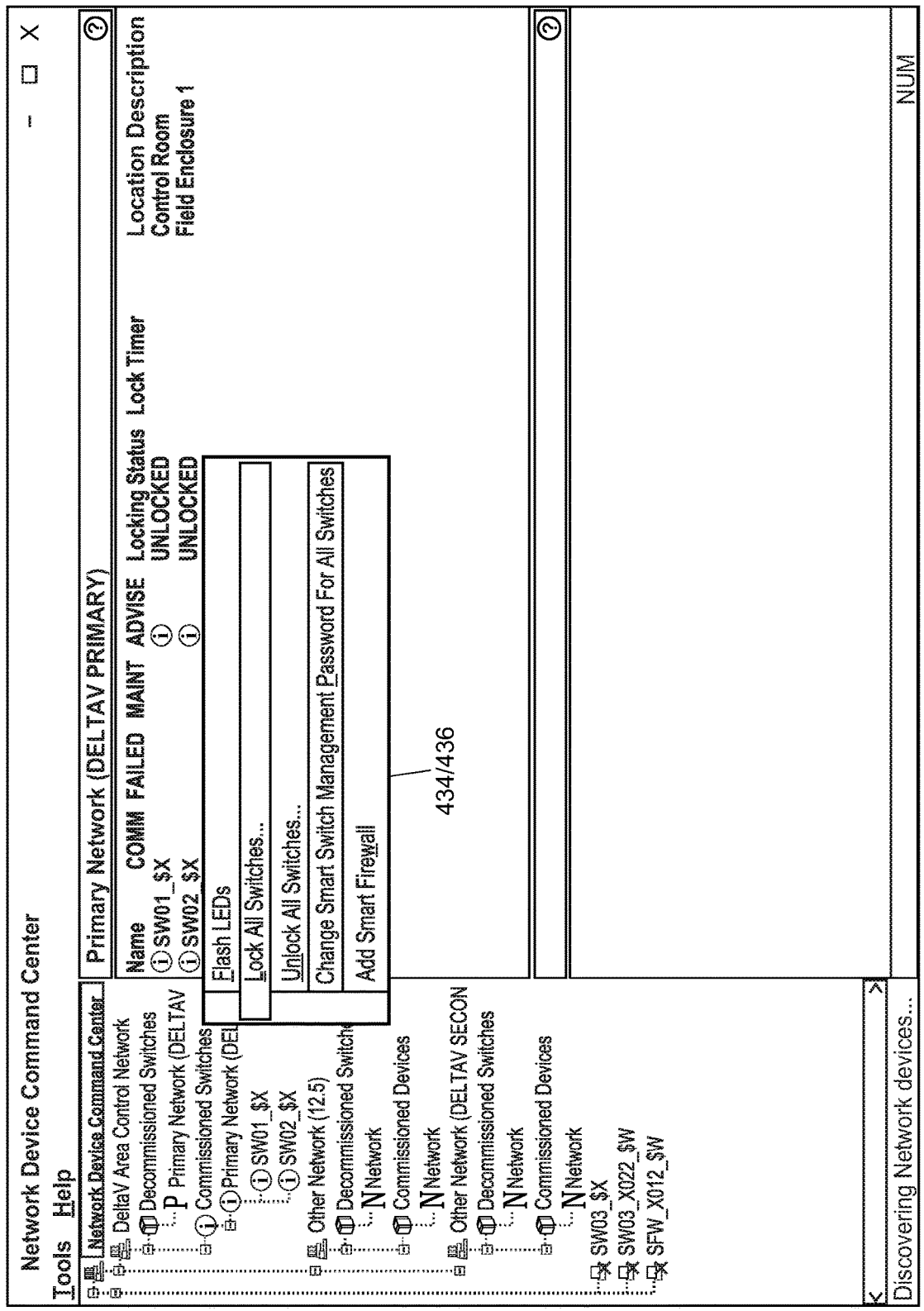
FIG. 4B illustrates the example user interface shown in FIG. 4A, populated with a set of unlocked switches.
Figure 4C:
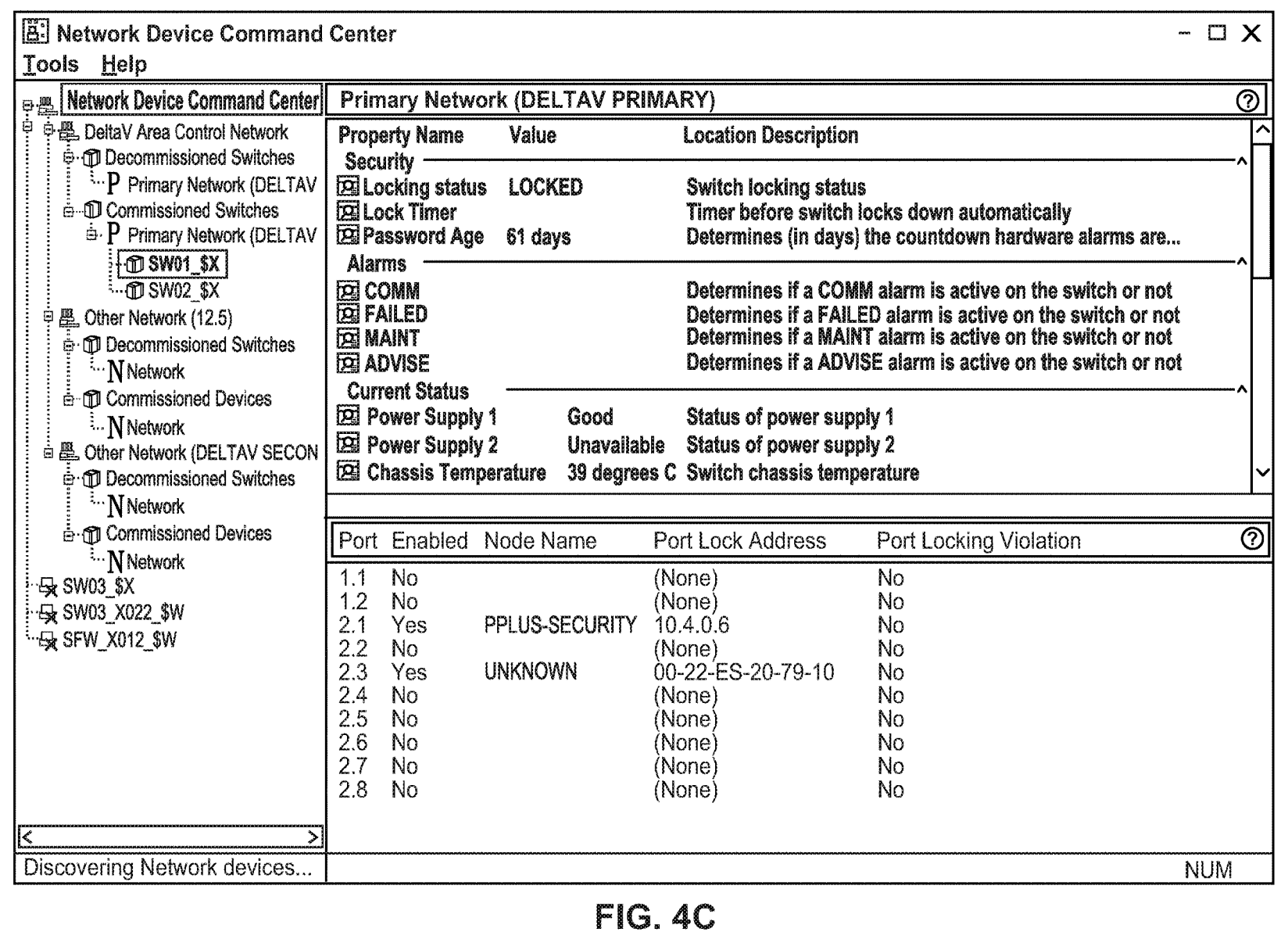

At block 306, one or more switch 146 (FIG. 4B) discovered at block 304 may be displayed by the user interface 400 by way of an expandable drop down menu 406 (FIG. 4A) and parameters for one of the discovered switches may be displayed for a switch 146 selected from the expandable drop down menu 406 (FIG. 4C). For example, security parameters such as locking status, lock timer, and password age may be shown in a window of the user interface 400. The window may also display switch alarms (e.g., COMM, FAILED, MAINT, ADVISE) and component status parameters (e.g., power supply status, chassis temperature, etc.). The ports of the switch may also be listed, along with a number of parameters for each port (e.g., indicating whether the port is enabled or disabled, identifying a node name for a connected end-node, identifying a port lock address, and/or indicating whether a port locking violation exists).

Once all of the discoverable switches 146 have been discovered, the user interface 400 may indicate that the search is complete. In some embodiments, when the method 300 is initiated for a first time, the switches 146 may be displayed with their physical address only in the interface 400's decommissioned switches list. When the discovered switches have not otherwise been locked down, the locking status may indicate that the discovered switches 146 are in an "unlocked" status. In an unlocked status, the switches 146 may be able to perform all normal functions within the network 150. In some embodiments, ports 202 in an unlocked status may perform the basic transparent bridging functions of learning, aging, and forwarding. A default aging time may be set to six-hundred seconds (ten minutes), although other default times may be set depending on the configuration of the switch 146 and the network 150. Upon completion of the search, the one or more function buttons 434 may be available for selection by a user or by an automatic process.

At block 308, a user or an automatic process may select one or more of the "unlocked" switches listed on the user interface 400 shown in FIG. 4A. The user may make this selection by utilizing an input device (e.g., a mouse or touchscreen) of the workstation to select the one or more desired switches, which may cause the user interface 400 to display a drop down menu with a selectable button for locking the switch. As shown in FIG. 4B, the user may also select an entire network (e.g., by right clicking on the desired network) to lockdown (i.e., wherein all of the switches 146 in the selected network are locked). In some instances, one or more switches 146 may include a hardware actuator (e.g., a button) that can be actuated to initiate lockdown. Further, an automatic process may select a switch for lockdown based on a trigger, such as a detection of a hostile device that has connected to the network 150 in some capacity.

At block 310, the workstation initiates a lockdown process (such as the method 325 shown in FIG. 3B) in response to detecting the user selecting a lock button, such as the lock button 436 shown in FIG. 4F. The lock buttons provided by the user interface 400 may initiate processes to selectively initiate the lockdown for different portions of the process control network 150. For example, separate buttons may provide the ability to selectively lock the entire network, the primary network, the secondary network, individual switches 146, or specific ports 202 at one or more selected switches 146. For additional security, the lockdown process may be initiated from only a selected workstation 120, 122 in some instances and may not be initiated through the Internet using, for example, a remote workstation that is not physical portion of the process control network 150 or may only be initiated from one or more pre-approved MAC addresses or IP addresses. Upon initiating the lockdown process by selecting a lock buttons, an authentication process may be initiated. For example, the workstation may request a username and password or other personal identification from the user to confirm access rights to the lockdown process. The application 400 may utilize administrative access through MIB 214 to lock and unlock switches 146. Communications may be encrypted, and any utilized keys or passwords may be unknown to the user but known to the switches 146 and the application 400.

Upon authentication after selecting a lock button, the workstation may send a lock command to a selected switch 146 (e.g., by setting one or more variables of the private MIB 214 of the selected switch 146). In response to receiving the lock command, the switch 146 may lock all of its ports 202. Generally speaking, locking a port 202 includes refusing to accept any message or frame 175 having a source MAC address 182 that is not included within the switching table 216 of the switch 146 at the time the locking state is activated. In some embodiments, disallowed physical addresses may be recorded in the memory 208 of the switch

146 (e.g., known, malicious MAC addresses, a range of MAC addresses that belong to unauthorized devices, etc.) and the switch 146 drops any received message that includes one of the disallowed physical addresses.

At block 311, after executing the lockdown process 325 for one or more switches 146, one or more of the switches 146 may need to be unlocked, for example, during troubleshooting operations, routine maintenance, diagnostics, network re-configuration, etc.

Figure 3C:
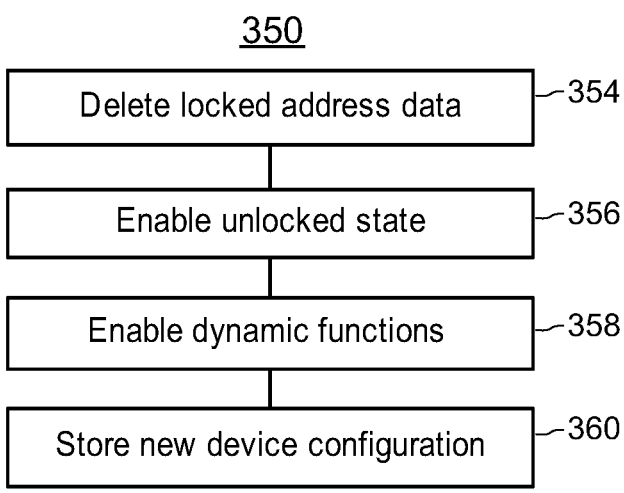
FIG. 3C illustrates an example method for unlocking the smart process control switch shown in FIGS. 1A, 1B, 2A, and 2B.
Figure 4D:
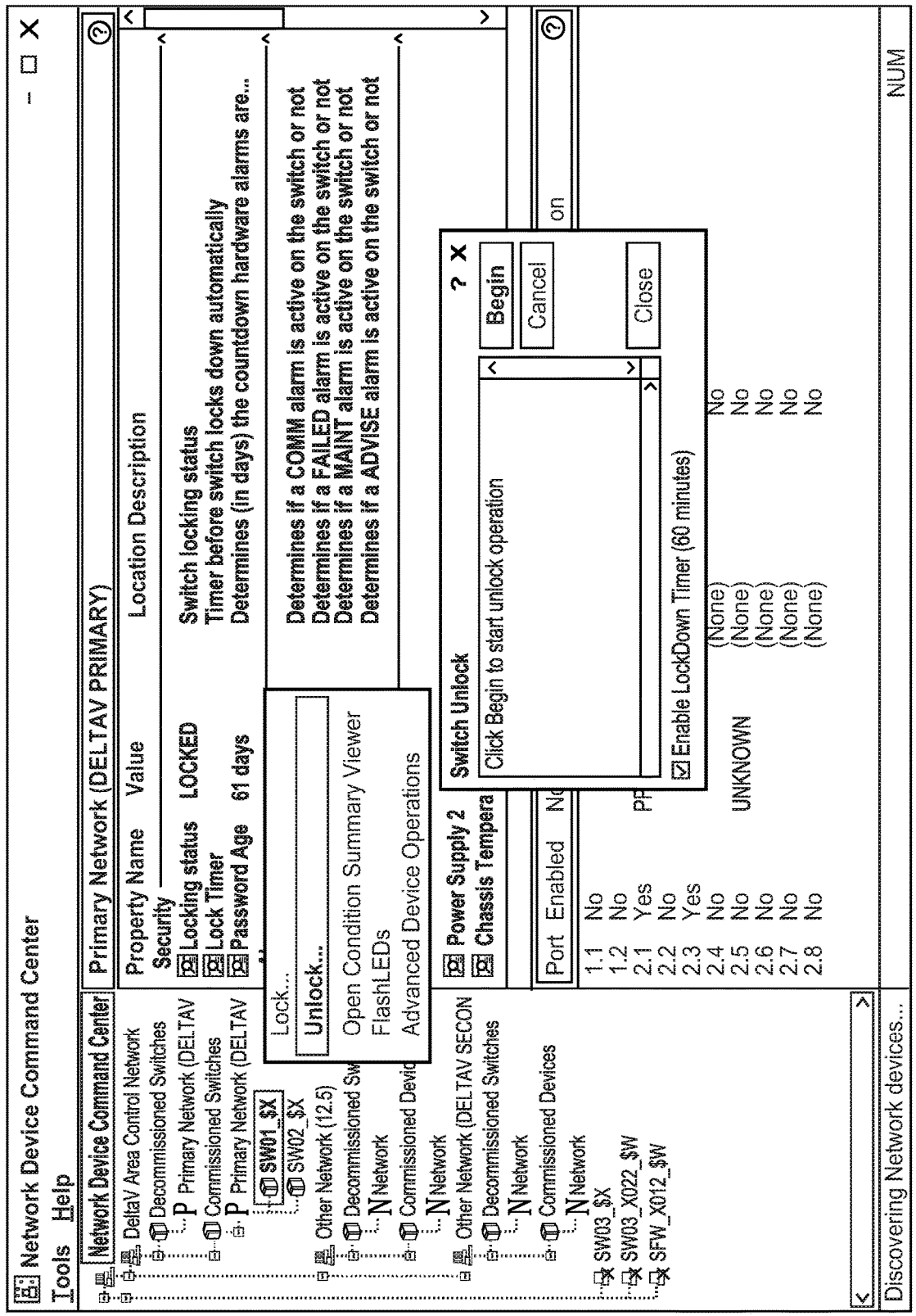
FIG. 4D illustrates the example user interface shown in FIGS. 4A, 4B, and 4C, populated with a set of switches having a "lock pending" status.

At block 312, a user or automatic process may select one or more of the switches 146 that is in a "locked" state and, at block 314, the workstation used by the user may initiate an unlocking process (such as the method 350 shown in FIG. 3C) in response to the user selecting an unlock button such as that shown in FIG. 4D). As with the lock buttons, the unlock button may initiate the unlocking process for different portions of the process control network 150 that were previously locked by utilizing one or more private MIBs 214. For additional security, the unlocking process may be configured with a lockdown timer that automatically re-locks one or more of the ports 220 that were previously locked. The lockdown timer may be configured with a default setting wherein, upon expiration of a period of time after completion of the unlocking process (block 316), one or more of the unlocked switches 146 may be re-locked (block 310). In one embodiment, the lockdown timer is configured with a default setting of sixty minutes (i.e., thirty-six hundred seconds). The unlocking process may be initiated from a selected workstation 120, 122 and may not be initiated through the Internet using, for example, a remote workstation that is not physical portion of the process control network 150 or may only be initiated from one or more pre-approved MAC addresses.

The unlocking process may also include an authentication process. For example, the workstation 120 or 122 and/or user interface 400 may request a username and password or other personal identification from the user to confirm access rights to the lockdown process. If the user is properly authenticated, the user may access the private MIB 214 of the one or more selected locked switches 146 and/or ports 202 to initiate unlocking.

Figure 3B:
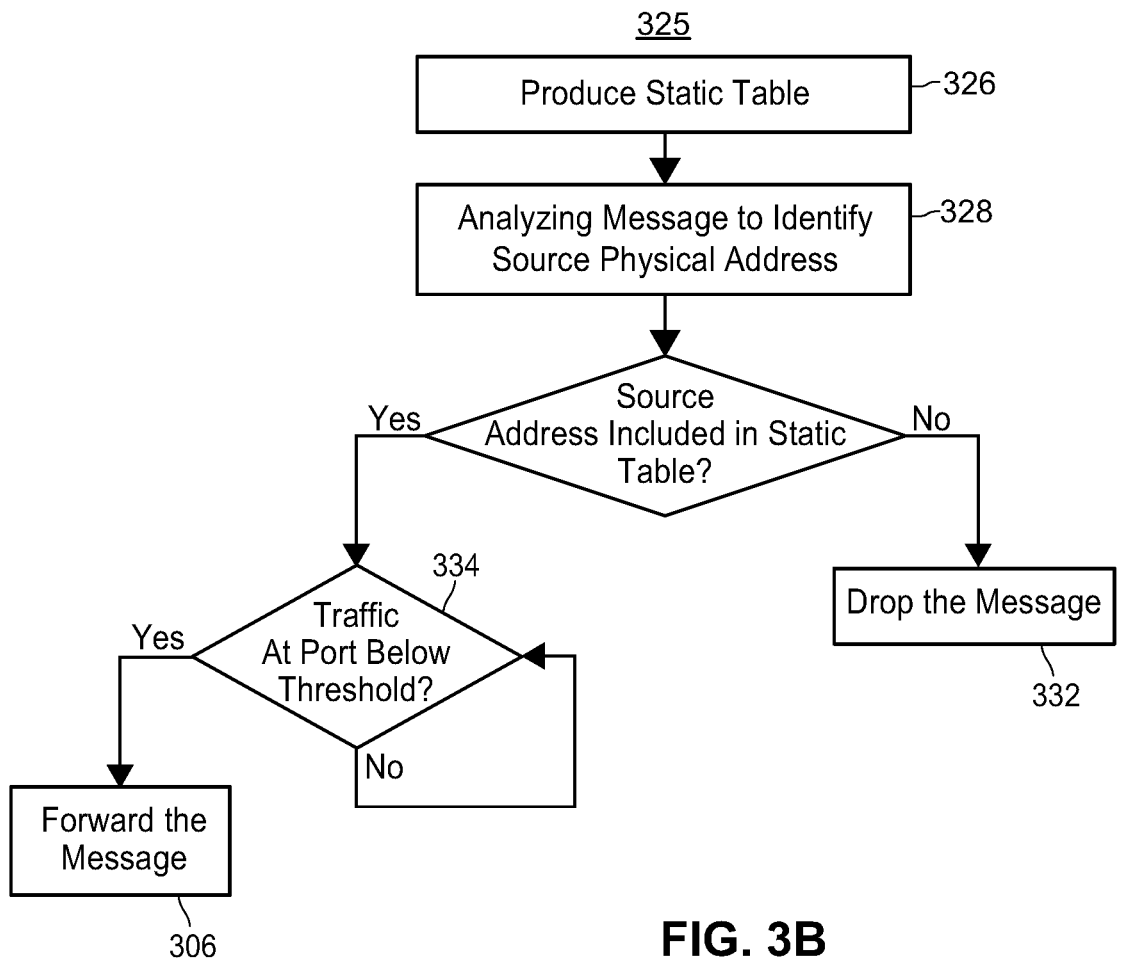
FIG. 3B illustrates an example method for locking the ports of the smart process control switch shown in FIGS. 1A-2C after receiving a lockdown command.

FIG. 3B illustrates an example method 325 for locking the ports 202 of the switch 146. The blocks described below may be implemented by the switch 146 and/or workstations 120 or 122.

At block 326, the switch 146 produces a static table, such as the static address table 220. Generally speaking, the static table is a record of known physical addresses connected to each port of the switch 146 at the time lockdown was initiated. The port states and/or physical address mapping may be stored either automatically or explicitly by a user (e.g., to the non-volatile memory 212). If desired, the record of known physical addresses may be used by the switch 146 upon power cycling or re-boot to prevent forcing open a locked port.

In some embodiments, the static table is produced by copying from the dynamic address table 218 the list of physical addresses mapped to each port 202. In some instances, the known physical addresses and other data may be completely removed from the dynamic address table 218 and moved to the static address table 220. In some embodiments, if the current number of learned addresses within the dynamic address table 218 is more than a maximum number, only a subset of the addresses may be locked. The remaining addresses may then be removed from the switching table 216 and may result in connectivity errors. Should connectivity issues occur, an error message may be sent to the user interface to indicate a failure in the lockdown process.

At block 328, the switch 146 may analyze each message received at each of the ports to identify a source physical address included in each message (e.g., the source MAC address 182 shown in FIG. 1C). The switch 146 may then determine whether the source physical address is included in the static table (block 330). If not, the source physical address is an unknown address, and the message is dropped (block 332).

If the source address from the message is included in the static table, the switch 146 analyzes the traffic at the port corresponding to the destination address included in the message (block 334). If the traffic at the forwarding port is below a traffic threshold stored to memory (e.g., input by a user or program during switch configuration), the message is forwarded (block 306). If not, the message is held until the traffic drops below the threshold, at which time the message is forwarded. In some implementations, the message may be dropped after a predetermined time, or may be immediately dropped. In some embodiments, the switch 146 additionally or alternatively analyzes traffic at the receiving port, and only analyzes the message's source address (block 328) when the traffic is below a predetermined traffic threshold.

Note, in some instances, the switch 146 may disable typical functions for the switch 146 during lockdown. In one embodiment, the switch 146 disables address learning and address aging functions for the switch 146 or for a specific port 202. For example, the dynamic address table 218 may be disabled and no longer accept any entries, the switch 146 may no longer flood the network 150 to discover new addresses, and the previously-received addresses may not be removed from the dynamic address table 218 after the aging time has expired.

After initiating the lockdown, the user interface 400 may change a lock status of one or more switches 146 from "unlocked" or a status indication from "done" to an indication that the selected device is locked or locking. With reference to FIG. 4C, upon completion of the lockdown process, the user interface 400 may display the "Locking Status" for any locked switch as "LOCKED."

FIG. 3C illustrates an example method 350 for unlocking the switch 146. The user's workstation may send an unlock command to the switch 146 (e.g., by changing a value of an object or variable of one of the private MIBs 214 of the switch 146).

At block 354, the address data in the static table 220 mapping physical addresses to particular ports may be deleted. In some embodiments, static address data that was added by a user or other explicit process may be retained in the static address table 220 during unlocking.

At block 356, the switch 146 may enable an unlocked state for the ports 220. In particular, the switch 146 will stop dropping messages having a source address that does not match the static table 218.

At block 358, the switch 146 may resume normal port or device functions. For example, in an unlocked state, the typical learning and aging functions that were suspended during lockdown may be resumed and the switching table 216 and dynamic table 218 may be repopulated.

At block 360, the switch 146 may store a new switch or port configuration. For example, the port states and/or physical addresses may be stored either automatically or explicitly by a user to be implemented by the switch 146 upon power cycling or re-boot.

In some embodiments, after initiating the unlock process at block 314, the user interface 400 may change the lock status of one or more switches from "locked" to an indication that the selected switches are in a "lock pending" status. Additionally, if the lockdown timer is initialized with the unlocking process, a time remaining status may indicate an amount of time remaining before the devices revert to a locked status. The time remaining may also be configured to never revert to the locked status. For example, an object of the private MIB 214 may be accessed to configure the timer to a "never revert" status, or any other amount of time.

In some embodiments, the switch 146 may revert to a saved configuration upon power up. For example, an entity may attempt to connect an unauthorized device to the process control network 150 by cycling the power of one or more switches 146 to force open a locked port. Upon power on, the switch 146 may be configured to access the saved configuration at its non-volatile memory 212 (FIG. 2). Therefore, regardless of whether or not a power cycled switch reverts to a locked or unlocked state, all devices connected to the network 150 before the power cycle may automatically re-establish communication with the system while any new device added to the port while the power was off will be refused. If the device powers on with a status of "unlocked" and the lockdown timer is greater than zero, the device may automatically enter a locked state after expiration of that time.

FIG. 5 illustrates an example of the address matching table 222, according to some embodiments. The address matching table 222 as illustrated in FIG. 5 may be a representation of data capable of being stored on the switch 146 (e.g., using content-addressable memory) and/or on another device within a process control system. Alternatively or additionally, a device (such as the switch 146, the work stations 120 or 122, or another device) may cause at least a portion of the information included in the address matching table 146 to be presented on a user interface (e.g., the user interface 400) for access and review by a user. It should be appreciated that the address matching table 222 is merely an example and thus includes exemplary information, and may include alternative and/or additional information.

The address matching table 222 may include a set of columns each populated with corresponding data and information. In particular, the address matching table 222 may include a port column 505, an IP address column 510, a MAC address column 515, a lockdown status column 520, and a security status column 525. The port column 505 may identify a set of the communication ports 202 of the switch 146 (as shown: communication ports 1 through 6). Each of the communication ports in the set of communication ports 202 may have a device or another switch connected thereto. If a communication port is connected to another switch 146, then the communication port may be considered an uplink port. While FIG. 5 depicts a single device (or no devices) connected to each port, it should be noted that a single port could be mapped to multiple devices, each of which would include a physical address (column 510), a network address (column 515), a lockdown status (column 520), and a security status (column 525).

The IP address column 510 may identify a set of network addresses (e.g., IP addresses) of a set of devices respectively connected to the set of communication ports 222, and the MAC address column 515 may identify a set of physical addresses (e.g., MAC addresses) of the set of devices respectively corresponding to the set of communication ports. For example, a device having IP address 10.10.10.2 and MAC address 00:0C:F5:09:56:E9 is connected to communication port "1." As illustrated in FIG. 5, neither communication port "3" nor communication port "6" has a device connected thereto, and thus the corresponding IP and MAC addresses are null.

The lockdown status column 520 may identify the lockdown status (e.g., "LOCKED" or "UNLOCKED") of each of the set of communication ports 222. As illustrated in FIG. 5, each of the communication ports 222 having a device connected thereto (communication ports "1," "2," "4," and "5") is "LOCKED," and each of the communication ports without a device connected thereto (communication ports "3" and "6") is "UNLOCKED." However, it should be noted that in a typical example, all ports of the switch 146 are locked when the switch 146 is locked except when the switch ports are either identified as uplink ports or manually configured by the user to be ignored (always unlocked) via CLI configuration. In embodiments as discussed herein, the switch 146 (and specifically, a set of ASICs of the switch 146) may obtain the IP and MAC addresses of the devices in association with initiating a lockdown of the occupied communication ports.

The security status column 525 may identify a security status of each of the set of communication ports. According to embodiments, the switch 146 may automatically and continuously monitor the information (e.g., as data packets) received and transmitted via the set of communication ports, between and among the devices already connected thereto and/or any other devices that may connect to the switch after lockdown of the switch.

The switch 146 may examine any received data packets to determine whether any discrepancies exist in the information included in the data packets. In particular, the switch 146 may compare information included in data packets to the information included in the address matching table 222 to identify discrepancies. If the switch 146 does not identify a discrepancy in data packet traffic for a particular communication port, then the security status of the particular communication port may be "NORMAL." In contrast, if the switch 146 identifies a discrepancy in the data packet traffic, then the security status of the particular communication port 222 may change from "NORMAL" to "ALERT."

As shown in FIG. 5, the security status for communication ports "2" and "6" is "ALERT" while the remainder of the communication ports have a security status of "NORMAL." In an example embodiment, the security status for communication port "2" may be "ALERT" because of an attempted ARP spoofing attack. In this embodiment, the device that is originally connected to communication port "2" may be replaced by an attacking device (or the originally-connected device may become compromised), which may send a data packet to the switch 146. The switch 146 may examine the data packet and determine that one or both of the IP address and the MAC address included in the data packet does not match the corresponding IP address and/or MAC address in the address matching table 222. Accordingly, the switch 146 may update the security status of the corresponding communication port to "ALERT."

Similarly, in an example embodiment, the security status for communication port "6" may also be "ALERT" because of an attempted ARP spoofing attack. In this embodiment, communication port "6" may be unlocked because, at the time of lockdown, there was not a device connected thereto. Subsequent to the lockdown, a device (which may or may not be an attacking device) may connect to unlocked communication port "6", and the device may send a data packet to the switch. The switch 146 may examine the data packet and determine that, because communication port "6" is unlocked, no device shall communicate via communication port "6". Accordingly, the switch may update the security status of the communication port to "ALERT".

The switch 146 may facilitate the communication and/or display of any detected alerts. In embodiments, the switch 146 may be connected to another device of the process control system that may be equipped with a user interface. The switch 146 may transmit an indication of one or more detected alerts to the device, where the device may configured to display or present the one or more detected alerts via the user interface. Accordingly, a user (e.g., an individual or administrator) associated with the process control plant may access and review the information and facilitate appropriate corrective or diagnostic actions.

Figure 6:
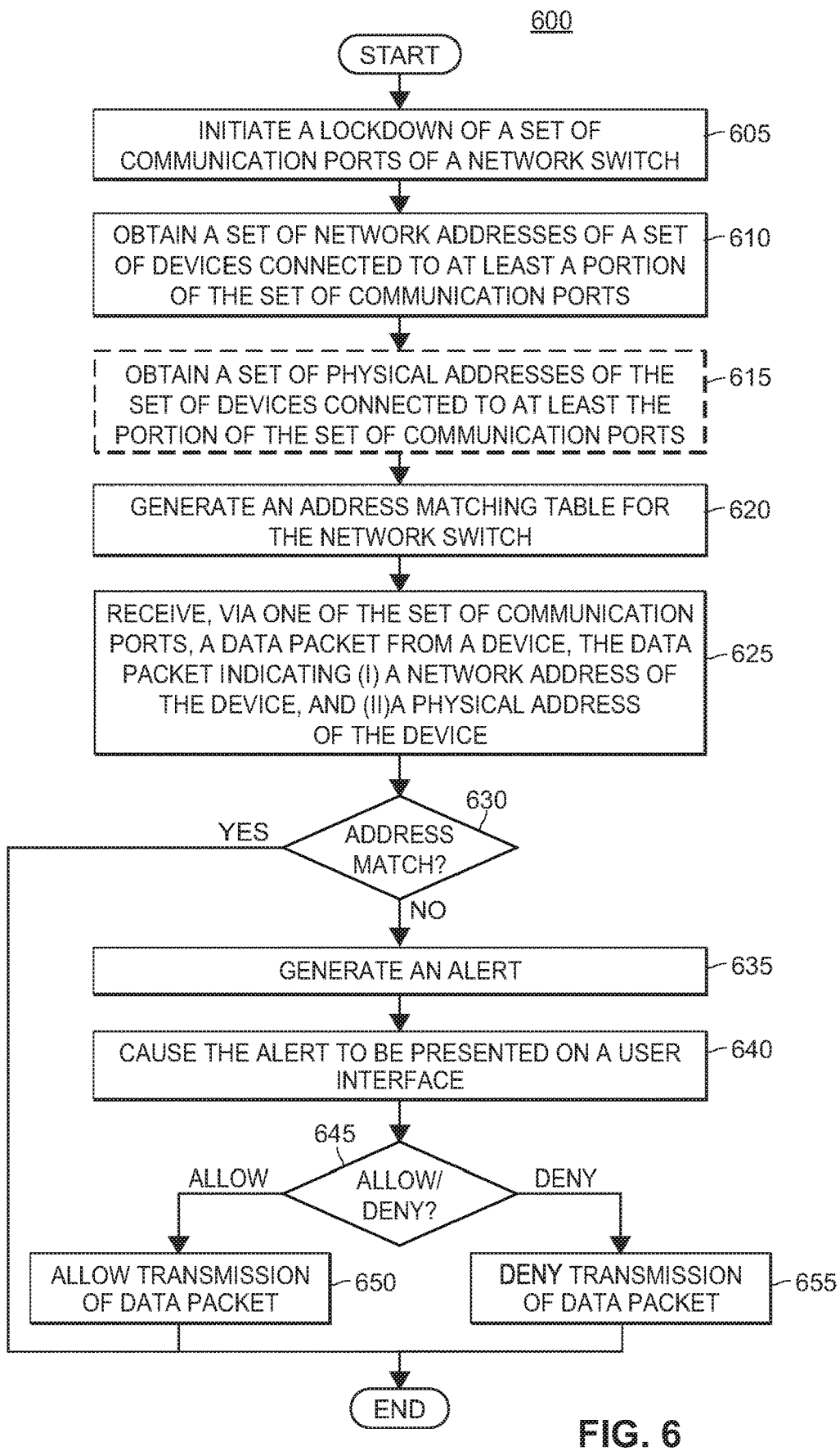
FIG. 6 depicts a block diagram of an example method of implementing the address matching table shown in FIGS. 2C and 5 to improve security of a process control system within a process plant.

FIG. 6 depicts a block diagram of an example method 600 of implementing the address matching table 222 to improve security of a process control system, such as the process control system 100, within a process plant. The method 600 may be facilitated by the switch 146.

The method 600 may begin when the switch 146 initiates (block 605) a lockdown of the set of communication ports of the switch 146. In embodiments, the switch 146 may initiate a lockdown of a portion or all of the set of communication ports 146.

In association with initiating the lockdown of the set of communication ports, the switch 146 may obtain (block 610) a set of network addresses (e.g., a set of IP addresses) of a set of devices connected to at least a portion of the set of communication ports. It should be appreciated that the switch may obtain the set of network addresses before, concurrently with, or after initiating (and/or completing) the lockdown. In an implementation, a set of ASICs incorporated into the switch may obtain the set of network addresses using data associated with the connection of the set of devices to at least the portion of the set of communication ports. Additionally or alternatively, the set of devices may include one or more devices within the process plant and/or one or more switches to which one or more additional devices (or additional switches) may connect. In a particular implementation, the switch 146 may obtain (i) a first network address of a first device connected to a first communication port (i.e., a device connection), and (ii) a plurality of network addresses of a plurality of devices connected to a second communication port via an additional switch (i.e., a switch connection). The network addresses may be obtained from another device on the process control network.

The switch 146 may, in association with initiating the lockdown, optionally obtain (block 615) a set of physical addresses (e.g., a set of MAC addresses) of the set of devices connected to at least the portion of the set of communication ports. It should be appreciated that the switch may obtain the set of physical addresses before, concurrently with, or after initiating (and/or completing) the lockdown. For example, the switch may obtain and record the set of physical addresses before initiating the lockdown. In an implementation, a set of ASICs (e.g., the circuit 230) incorporated into the switch 146 may obtain the set of physical addresses using data associated with the connection of the set of devices to at least the portion of the set of communication ports.

The switch 146 may generate (block 620) address matching table 222 for the switch 146, where the address matching table 222 may match the set of physical addresses of the set of devices to the set of network addresses of the set of devices. The address matching table 222 may further match the set of physical addresses and the set of network addresses to at least the portion of the set of communication ports. That is, for every device connected (directly or indirectly) to a particular port of the switch 146, the address mapping table 222 may list an address pair of network and physical addresses for the particular port. Accordingly, a port connected to multiple devices will have multiple associated address pairs (i.e., one address pair for each connected device). The switch 146 may locally store (e.g., using content-addressable memory) the address matching table for access and review.

The switch 146 may receive (block 625), via one of the set of communication ports, a data packet from a device, where the data packet may indicate at least (i) a network address of the device, and (ii) a physical address of the device. In embodiments, the device may be connected to the one of the set of communication ports prior to or after the switch 146 initiates the lockdown. Additionally or alternatively, the device may replace another device that was previously connected to the one of the set of communication ports (i.e., in the event of a cable replacement). Additionally or alternatively, the device may be connected to an unlocked communication port or to a communication port of the portion of the set of communication ports (i.e., a communication port that was locked).

According to embodiments, the data packet may represent an ARP spoofing attack by the device, which the switch 146 may be configured to determine by determining (block 630) whether the network address of the device and the physical address of the device are included in the address matching table 222. In particular, the network address and the physical address of the device, as a pair, may not match the mapped network address and the mapped physical address included in the address matching table for the communication port to which the device is connected. For example, if the device is connected to communication port "3", and either or both of the network address and the physical address of the device does not match the corresponding mapped addresses for communication port "3", then there is a mismatch.

If the switch 146 determines that the addresses match ("YES"), then processing may end, repeat, or proceed to other functionality. In contrast, if the switch 146 determines that the addresses do not match ("NO"), then there may be an ARP spoofing attempt and the switch 146 may generate (block 35) an alert. In embodiments, the alert may indicate the one of the set of communication ports to which the device is connected, and/or other information including the network address and/or the physical address of the device. Additionally, the switch 146 may cause (block 40) the alert to be presented on a user interface, where the user interface may be included on another device or component within the process plant. Accordingly, a user (e.g., a plant technician or administrator) may review the content of the alert and initiate proper action.

The switch 146 may further determine (block 645) whether to allow or deny transmission of the data packet. In embodiments, the determination may be a default selection (e.g., always allow or always deny), or the switch 146 may dynamically determine whether to allow or deny transmission based on one or more factors, such as the content of the data packet itself, the physical address of the device, the network address of the device, and/or other factors.

If the switch determines to allow transmission ("ALLOW"), the switch may allow (block 50) transmission of the data packet. In contrast, if the switch 146 determines to deny transmission ("DENY"), the switch may deny transmission of the data packet (i.e., may drop the data packet).

Figure 7:
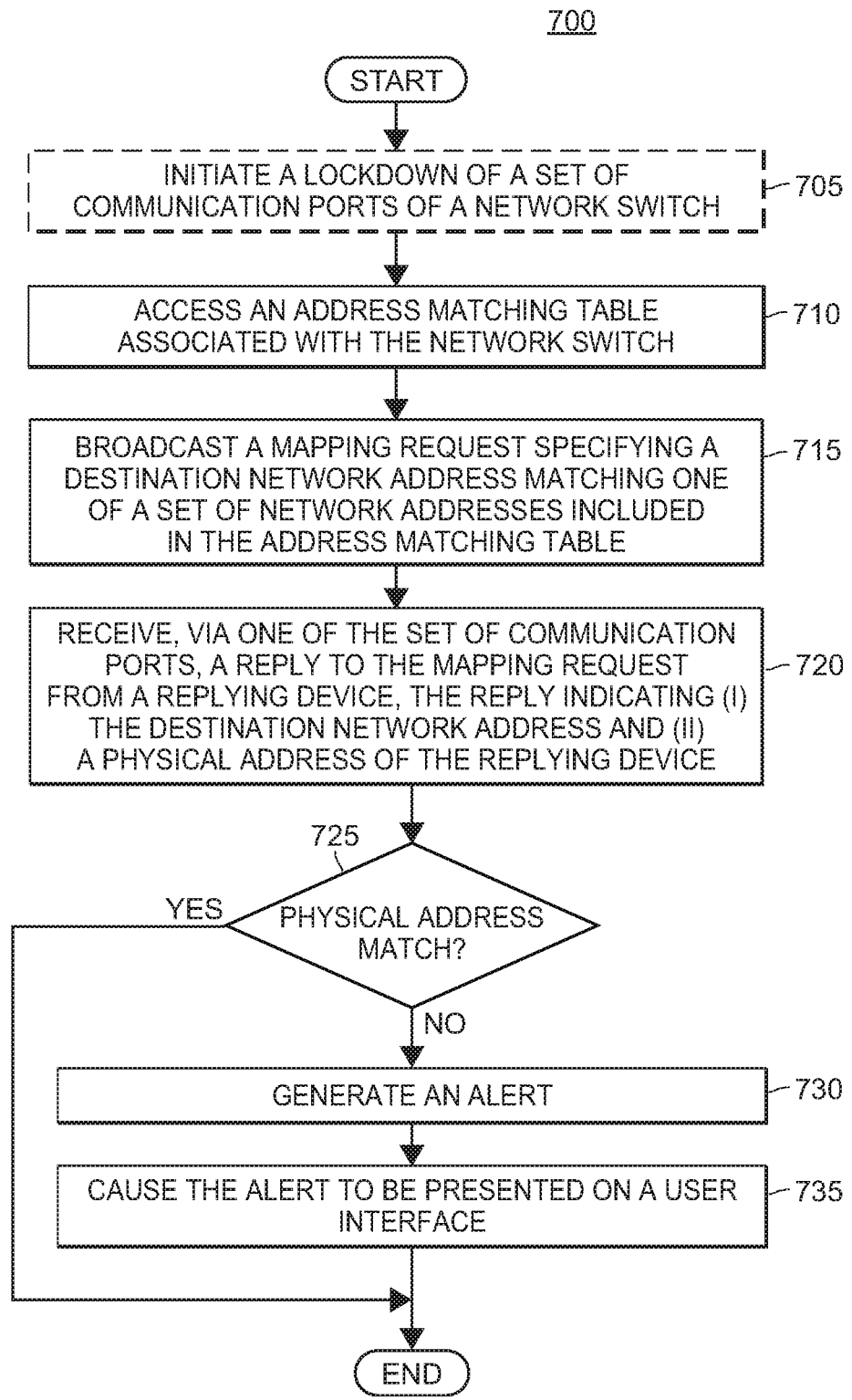
FIG. 7 depicts a block diagram of an example method of detecting security issues associated with the smart process control switches shown in FIGS. 1A-2C.

FIG. 7 depicts a block diagram of an example method 700 of detecting security issues associated with the switch 146. The method 700 may be facilitated by the switch 146.

The method 700 may begin when the switch 146 optionally initiates (block 705) a lockdown of a set of communication ports of the switch 146, as described herein. In embodiments, the switch 146 may initiate a lockdown of a portion or all of the set of communication ports, such that, in some instances, one or more of the communication ports may remain unlocked if desired.

In association with initiating the lockdown of the set of communication ports, the switch 146 may obtain a set of network addresses (e.g., a set of IP addresses) of the set of devices connected to at least a portion of the set of communication ports. It should be appreciated that the switch 146 may obtain the set of network addresses before, concurrently with, or after initiating (and/or completing) the lockdown. In an implementation, a set of ASICs incorporated into the switch 146 may obtain the set of network addresses using data associated with the connection of the set of devices to at least the portion of the set of communication ports. Additionally or alternatively, the set of devices may include one or more devices within the process plant and/or one or more switches to which one or more additional devices (or additional switches) may connect. In a particular implementation, the switch 146 may obtain (i) a first network address of a first device connected to a first communication port (i.e., a device connection), and (ii) a plurality of network addresses of a plurality of devices connected to a second communication port via an additional switch (i.e., a switch connection).

The switch 146 may, in association with initiating the lockdown, optionally obtain a set of physical addresses (e.g., a set of MAC addresses) of the set of devices connected to at least the portion of the set of communication ports. It should be appreciated that the switch may obtain the set of physical addresses before, concurrently with, or after initiating (and/or completing) the lockdown. For example, the switch 146 may obtain and record the set of physical addresses before initiating the lockdown. In an implementation, a set of ASICs incorporated into the switch 146 may obtain the set of physical addresses using data associated with the connection of the set of devices to at least the portion of the set of communication ports.

The switch 146 may further generate and access (block 710) the address matching table 222, where the address matching table 222 may match the set of physical addresses of the set of devices to the set of network addresses of the set of devices. The address matching table 222 may further match the set of physical address and the set of network addresses to at least the portion of the set of communication ports. Accordingly, each communication port having a device connected thereto may have an associated physical address of the device and a network address of the device. In an implementation, the set of ASICs incorporated into the switch 146 may generate the address matching table 222. The switch 146 may locally store (e.g., using content-addressable memory) the address matching table for access and review.

The switch 146 may broadcast (block 615) a mapping request specifying a destination network address matching one of the set of network addresses included in the address matching table. In embodiments, the mapping request may be in the form of an ARP request including an IP address from the address mapping table, where the ARP request is intended to find a MAC address corresponding to the IP address, and where the ARP request may be sent to each device connected to the switch.

The switch 146 may receive (block 720), via one of the set of communication ports, a reply to the mapping request from a replying device, where the reply may indicate (i) the destination network address and (ii) a physical address of the replying device. According to embodiments, the reply from the replying device may represent an attempted ARP spoofing attack by the replying device, which the switch 146 may be configured to determine.

Accordingly, the switch 146 may determine (block 725) whether the physical address of the replying device matches any of the set of physical addresses of the set of devices included in the address matching table. In particular, the physical address of the replying device may not match the mapped physical address included in the address matching table 222 for the communication port to which the replying device is connected. For example, if the replying device is connected to communication port "3", and the physical address of the replying device does not match the corresponding mapped physical address for communication port "3", then there is a mismatch. In an implementation, the set of ASICs incorporated in the network may make the determination.

If the switch 146 determines that the physical addresses match ("YES") (i.e., there is not an attempted ARP spoofing attack), then processing may end, repeat, or proceed to other functionality. In contrast, if the switch 146 determines that the physical addresses do not match ("NO"), then there may be an ARP spoofing attempt and the switch may generate (block 730) an alert. In embodiments, the alert may indicate the one of the set of communication ports to which the replying device is connected, and/or other information including the network address and/or the physical address of the replying device. Additionally, the switch 146 may cause (block 735) the alert to be presented on a user interface, where the user interface may be included on another device or component within the process plant. Accordingly, a user (e.g., a plant technician or administrator) may review the content of the alert and initiate proper action.

The lockdown routines and address mapping routines described herein may be implemented in software, hardware, firmware, or some combination thereof. Thus, the methods 300, 325, 350, 500, 600, and 700 described herein may be implemented in a standard multi purpose CPU and/or on specifically designed hardware or firmware such as ASICs. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc. (which is viewed as being the same as or interchangeable with providing such software via a transportable storage medium).

Generally speaking, as used herein the phrase "memory" or "memory device" refers to a system or device including computer-readable media ("CRM"). "CRM" refers to a medium or media accessible by the relevant computing system for placing, keeping, and/or retrieving information (e.g., data, computer-readable instructions, program modules, applications, routines, etc). Note, "CRM" refers to media that is non-transitory in nature, and does not refer to disembodied transitory signals, such as radio waves.

As noted with reference to FIG. 1A, the network 150 is a collection of nodes (e.g., devices or systems capable of sending, receiving and/or forwarding information) and communication links connected to enable telecommunication between the nodes. Generally speaking, the term "node" refers to a connection point, redistribution point, or a communication endpoint. A node may be any device or system (e.g., a computer system) capable of sending, receiving and/or forwarding information. For example, end-devices or end-systems that originate and/or ultimately receive a message are nodes. Intermediary devices that receive and forward the message (e.g., between two end-devices) are also generally considered to be "nodes." A "communication link" or "link" is a pathway or medium connecting two or more nodes. A link may be a physical link and/or a logical link. A physical link is the interface and/or medium(s) over which information is transferred, and may be wired or wireless in nature. Examples of physicals links may include a cable with a conductor for transmission of electrical energy, a fiber optic connection for transmission of light, and/or a wireless electromagnetic signal that carries information via changes made to one or more properties of an electromagnetic wave(s).

What is claimed is:

1. A method of improving security of a process control system within a process plant, the process control system comprising process control switches connected to devices via communication ports of the process control switches, the method comprising:
    maintaining a first record for a process control switch that maps hardware addresses of devices that have communicated via the process control switch to a plurality of communication ports of the process control switch, wherein the first record includes a plurality of sets of hardware address including: (i) a first set of hardware addresses for a set of devices that have communicated via a first communication port from the plurality of communication ports; and (ii) an additional one or more sets of hardware addresses each corresponding to a different one of an additional one or more communication ports from the plurality of communication ports;
    maintaining a second record for the process control switch that maps a different network address to each hardware address included in the first record, including updating the second record with a new network address when a new hardware address for a new device is detected communicating via the first communication port;
    initiating a lockdown of the first communication port of the process control switch;
    responding to the initiation of the lockdown by generating, from the first and second records, a third record of a of known address pairs at the time of lockdown for the first communication port, wherein each known address pair includes a hardware address and a corresponding network address; and
    after the lockdown of the first communication port:
    receiving, via the first communication port, a data packet from a device, the data packet indicating (i) a particular network address of the device and (ii) a particular hardware address of the device,
    selectively forwarding the data packet to a destination address, including: (i) when the third record includes a known address pair including both the particular hardware address and the particular network address, forwarding the data packet to the destination address; and (ii) when the third record does not include a known address pair that includes both the particular network address and the particular hardware address: (a) not forwarding the data packet to the destination address, and (b) generating an alert.

2. The method of claim 1, wherein generating the alert comprises:
    generating the alert to indicate that a mismatch of hardware addresses exists at the first communication port; and
    causing the alert to be presented on a user interface of a computing device associated with the process control system.

3. The method of claim 1, wherein maintaining the second record for the process control switch comprises maintaining the second record via a set of application-specific integrated circuits (ASICs) incorporated into the process control switch.

4. The method of claim 1, wherein the process control switch operates on the second layer and the third layer of the Open Systems Interconnection (OSI) model.

5. A process control switch for use in a process control system within a process plant, comprising:
    a set of communication ports to which devices of the process control system are configured to connect;
    content-addressable memory; and
    a set of application-specific integrated circuits (ASICs) communicatively coupled to the set of communication ports and the content-addressable memory, and configured to:
    (a) initiate a lockdown of at least a first communication port;
    (b) respond to the initiation of the lockdown by generating a record of known address pairs at the time of lockdown for the first communication port, wherein each known address pair includes a hardware address and a corresponding network address for devices that have been detected communicating via the first communication port:
    (c) after the lockdown of the first communication port:
    (1) receive, via the first communication port, a data packet from a device, the data packet indicating (i) a particular network address of the device and (ii) a particular hardware address of the device,
    (2) selectively forward the data packet to a destination address, including: (i) when the record includes a known address pair including both the particular hardware address and the particular network address, forwarding the data packet to the destination address; and (ii) when the record does not include a known address pair that includes both the particular network address of the device and the particular hardware address of the device, dropping the data packet.

6. The process control switch of claim 5, wherein the process control switch operates on the second layer and the third layer of the Open Systems Interconnection (OSI) model.

7. A method of detecting security issues associated with a process control switch associated with a process control system within a process plant, the process control switch connected to a set of devices via a set of communication ports of the process control switch, the method comprising:
    accessing an address matching table associated with the process control switch, wherein the address matching table includes one or more known address pairs for each port in a set of communication ports of the process control switch, wherein each known address pair includes a hardware address of a device and a network address of the device;

broadcasting a mapping request specifying a destination network address, the destination network address matching a particular network address included in a particular known pair included in the address matching table;

receiving, via one of the set of communication ports, a reply to the mapping request from a replying device, the reply indicating (i) the destination network address and (ii) a hardware address of the replying device;

determining that the hardware address of the replying device does not match a particular hardware address included in the particular known pair included in the address matching table; and in response to the determining, generating an alert.

8. The method of claim 7, further comprising:
generating the address matching table using a set of application-specific integrated circuits (ASICs) incorporated into the process control switch.

9. The method of claim 7, further comprising:
initiating a lockdown of the set of communication ports of the process control switch.

10. The method of claim 9, further comprising:
in association with initiating the lockdown of the set of communication ports:
obtaining, by the process control switch, network addresses of a set of devices connected to each communication port in the set of communication ports, and
generating the address matching table.

11. The method of claim 7, wherein determining that the hardware address of the replying device does not match a particular hardware address included in the particular known pair included in the address matching table comprises:
performing said determining via a set of application-specific integrated circuits (ASICs) incorporated into the process control switch.

12. The method of claim 7, wherein the address matching table further links each known pair to at least a portion of the set of communication ports of the process control switch.

13. The method of claim 12, wherein the particular known pair is linked to a first communication port and wherein broadcasting the mapping request comprises broadcasting via the first communication port.

14. The method of claim 7, wherein generating the alert comprises:
generating the alert to indicate that a mismatch of hardware addresses exists at a communication port at which the reply was received; and
causing the alert to be presented on a user interface of a computing device associated with the process control system.

15. A system for detecting security issues associated with a process control system within a process plant, comprising:

a user interface configured to present content; and
a process control switch connected, via a set of communication ports, to a set of devices associated with the process control system, and configured to:
access an address matching table associated with the process control switch, wherein the address matching table includes one or more known address pairs for each port in a set of communication ports of the process control switch, wherein each known address pair includes a hardware address of a device and a network address of the device
broadcast a mapping request specifying a destination network address, the destination network address matching a particular network address included in a particular known pair included in the address matching table,
receive, via one of the set of communication ports, a reply to the mapping request from a replying device, the reply indicating (i) the destination network address and (ii) a hardware address of the replying device,
determine that the hardware address of the replying device does not match a particular hardware address included in the particular known pair included in the address matching table, and
in response to the determining:
generate an alert, and
cause the alert to be presented on the user interface.

16. The system of claim 15, wherein the process control switch comprises a set of application-specific integrated circuits (ASICs), and wherein the process control switch is further configured to:
generate the address matching table using the set of ASICs.

17. The system of claim 15, wherein the process control switch is further configured to:
initiate a lockdown of the set of communication ports of the process control switch.

18. The system of claim 17, wherein the process control switch is further configured to, in association with initiating the lockdown of the set of communication ports:
obtain the set of network addresses of a set of devices connected to each communication port in the set of communication ports, and
generate the address matching table.

19. The system of claim 15, wherein the address matching table further matches each of the known pairs to at least a portion of the set of communication ports of the process control switch.

20. The system of claim 19, wherein the particular known pair is linked to a first communication port and wherein broadcasting the mapping request comprises broadcasting via the first communication port.

\* \* \* \* \*